United States Patent
Yamazaki et al.

(10) Patent No.: US 6,937,459 B2
(45) Date of Patent: Aug. 30, 2005

(54) SEPARATOR FOR ELECTRIC DOUBLE-LAYER CAPACITOR, ELECTRIC DOUBLE-LAYER CAPACITOR, AND MANUFACTURING METHOD OF SEPARATOR FOR ELECTRIC DOUBLE-LAYER CAPACITOR

(75) Inventors: Kouji Yamazaki, Saitama (JP); Mitsutoshi Suzuki, Saitama (JP); Kazuhiko Yanagi, Saitama (JP); Minoru Noguchi, Saitama (JP); Eisuke Komazawa, Saitama (JP); Hiroshi Nagao, Tokushima (JP); Michio Matsuda, Tokushima (JP)

(73) Assignees: Mahle Tennex Corporation, Tokyo (JP); Honda Motor Co., Ltd., Tokyo (JP); AWA Paper Mfg. Co., Ltd., Tokushima (JP)

(*) Notice: Subject to any disclaimer, the term of this patent is extended or adjusted under 35 U.S.C. 154(b) by 0 days.

(21) Appl. No.: 10/849,505

(22) Filed: May 20, 2004

(65) Prior Publication Data

US 2004/0264108 A1 Dec. 30, 2004

(30) Foreign Application Priority Data

May 23, 2003 (JP) ....................... 2003-146935

(51) Int. Cl.$^7$ ................................ H01G 9/00
(52) U.S. Cl. ...................... 361/502; 361/503
(58) Field of Search ................ 442/327, 411, 442/415; 361/502, 503; 29/25.03

(56) References Cited

U.S. PATENT DOCUMENTS 5,954,962 A * 9/1999 Adiletta .................. 210/490

FOREIGN PATENT DOCUMENTS

| JP | 7-29560 | * 1/1995 | ............ H01M/2/16 |
|---|---|---|---|
| JP | 9-31883 | 2/1997 | |
| JP | 2001-185455 | 7/2001 | |
| JP | 2001-244150 | 9/2001 | |

* cited by examiner

Primary Examiner—Eric W. Thomas
(74) Attorney, Agent, or Firm—Armstrong, Kratz, Quintos, Hanson & Brooks, LLP

(57) ABSTRACT

The present invention is mainly configured of a separator for an electric double-layer capacitor that comprises an aramid fiber, a polyester fiber, a glass fiber, and a silica (inorganic compound for forming hydrosol) containing a particulate silica (particulate inorganic compound) of not less than 1 nm and not more than 500 nm, wherein total of the silica and the glass fiber is not less than 10 mass percent and not more than 50 mass percent; the electric double-layer capacitor comprising the separator; and a manufacturing method of the separator for the electric double-layer capacitor which method comprises a mixing process for mixing the aramid fiber, the polyester fiber, the glass fiber, and the silica sol and a paper making process for making paper from the mixture.

18 Claims, 14 Drawing Sheets

Polyester Fiber (0.11 dtex × 3 mm), 30 mass percent constant; and Surface Density, 15 g/m² constant for All Polyester Fiber (0.11 dtex × 3 mm), 30 mass percent constant; and Surface Density, 15 g/m² constant for Comparison Examples Glass Fiber (0.8 μm), 30 mass percent constant for Examples;
Polyester Fiber (0.11 dtex × 3 mm), 15 to 30 mass percent; and
Surface Density, 15 g/m² constant for All Glass Fiber (0.8 μm), 30 mass percent constant for Examples;
Polyester Fiber (0.11 dtex × 3 mm), 15 to 30 mass percent; and
Surface Density, 15 g/m² constant for All Polyester Fiber (0.22 dtex × 3 mm), 30 mass percent constant; and Surface Density, 15 g/m² constant for Examples Polyester Fiber (0.22 dtex × 3 mm), 30 mass percent constant; and Surface Density, 15 g/m² constant for Examples Polyester Fiber (0.22 dtex × 3 mm), 30 mass percent constant; and Surface Density, 15 g/m² constant for Examples Polyester Fiber (0.22 dtex × 3 mm), 30 mass percent constant;and Surface Density, 15 g/m² constant for Examples

FIG. 15

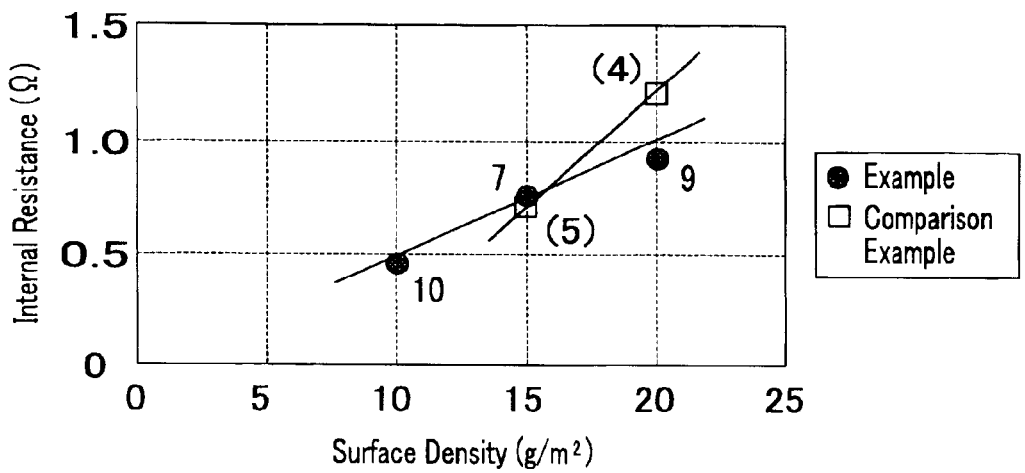

Glass Fiber (0.8 μm), 20 mass percent constant for Examples; Aramid Fiber, 50 mass percent for Examples and 70 mass percent for Comparison Examples; and Polyester Fiber (0.22 dtex × 3 mm), 30 mass percent constant for All

FIG. 16

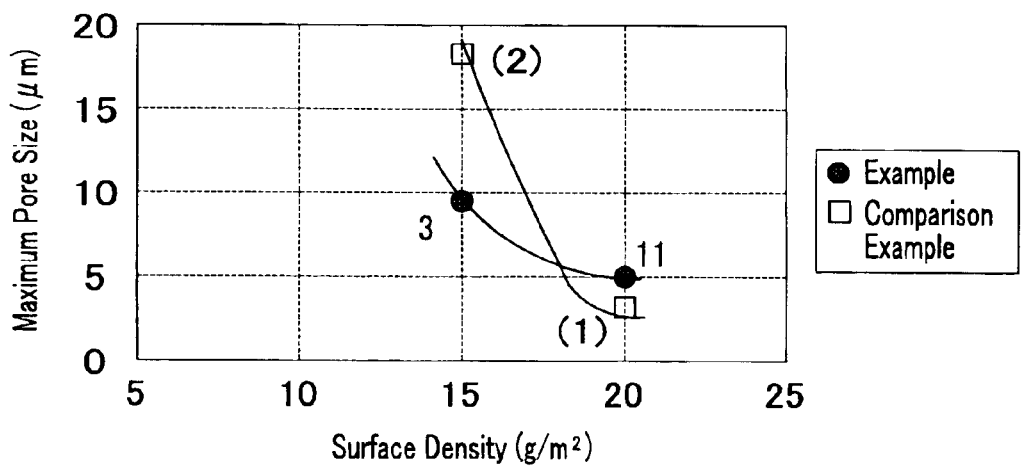

Glass Fiber (0.8 μm), 30 mass percent constant for Examples; Aramid Fiber, 40 mass percent for Examples and 70 mass percent for Comparison Examples; and Polyester Fiber (0.11 dtex × 3 mm), 30 mass percent constant for All Polyester Fiber (0.11 dtex × 3 mm), 30 mass percent constant;and Surface Density, 15 g/m² constant for Examples Glass Fiber (0.8 μm), 20 mass percent constant for Examples; Aramid Fiber, 50 mass percent for Examples and 70 mass percent for Comparison Examples; and Polyester Fiber (0.22 dtex × 3 mm), 30 mass percent constant for All

SEPARATOR FOR ELECTRIC DOUBLE-LAYER CAPACITOR, ELECTRIC DOUBLE-LAYER CAPACITOR, AND MANUFACTURING METHOD OF SEPARATOR FOR ELECTRIC DOUBLE-LAYER CAPACITOR

BACKGROUND OF THE INVENTION

1. Field of the Invention

The present invention relates to a separator for an electric double-layer capacitor, the electric double-layer capacitor, and a manufacturing method of the separator for the electric double-layer capacitor.

2. Description of the Related Art

An electric double-layer capacitor is also called an electric double-layer condenser, has a large capacity of a farad level, is superior in a cyclic property of a charging/discharging, and can be rapidly charged, so it is used for usages such as a backup power source of electronic appliances and a vehicle mount battery (energy buffer).

An outline of the electric double-layer capacitor will be described, referring to FIG. 5, which is a section view showing a basic configuration of the electric double-layer capacitor.

An electric double-layer capacitor 101 has, as shown in FIG. 5, a configuration where a container 102, a pair of polarizable electrodes 104 disposed with opposing separators 103 for the electric double-layer capacitor within the container 102 (hereinafter abbreviated to the 'separator' as needed), and a pair of current collectors 105 are housed. And within the container 102 an ion conductive electrolytic solution is injected. The electric double-layer capacitor 101 is a so-called secondary battery that repeats the charging/discharging with making charges (shown in symbols of + and − in FIG. 5), which are generated at an interface between the polarizable electrodes 104 and the electrolytic solution, a dielectric by an absorption/desorption of electrolytic solution ions to the polarizable electrodes 104 that are solid.

And for the separators 103 are necessary such an insulation property so as not to generate an electric leak between the polarizable electrodes 104 disposed at both sides of the separators 103, a high wetability for the electrolytic solution so that ions injected in the electrolytic solution can freely move, and thinness so as to be able to be housed more, for example, in a winding electric double-layer capacitor and the like.

Conventionally, as the separator for the electric double-layer capacitor are used mixed paper obtained by mixing the fibers such as olefin resins (for example, polyethylene, polypropylene, and the like), a cellulose, a polyester, and an aramid, and making paper from them (for example, see pages 3 to 5 in Japanese Patent Laid-Open Publication Hei 9-31883, pages 4 and 5 in Japanese Patent Laid-Open Publication 2001-244150, and pages 3 to 5 in Japanese Patent Laid-Open Publication 2001-185455).

Furthermore, these years an organic solvent such as propylene carbonate, which is high in withstand voltage, is used as a solvent of an electrolyte in order to make the electric double-layer capacitor a large capacity. With respect to such a manufacturing process of the electric double-layer capacitor, in order to further heighten the withstand voltage and an energy density, the electrolytic solution is injected after moisture, which is low in withstand voltage and easy to be electrolyzed, is completely removed, and electrodes, separators, and the like are sufficiently dried.

Accordingly, the separator used for the electric double-layer capacitor is desirable to have a sufficient heat resistance for enduring a drying process, and generally, the separator formed of an aramid fiber and polyester fiber having the heat resistance is widely produced and used.

However, the aramid fiber, the polyester fiber (for example, polyethylene terephthalate), and the like is an aromatic synthetic fiber containing a benzene ring. Accordingly, there is a problem that due to an influence of hydrophoby which the aromatic synthetic fiber has, the separator becomes low in wetability for the electrolytic solution where such the propylene carbonate, which is strong in hydrophily, is made a solvent.

Consequently, are strongly requested a separator for an electric double-layer capacitor that is high in wetability for the electrolytic solution and has the heat resistance and flexibility, the electric double-layer capacitor comprising the separator, and furthermore, a manufacturing method of the separator for the electric double-layer capacitor that is good in workability and excellent in productivity.

SUMMARY OF THE INVENTION

A first aspect of the present invention is a separator for an electric double-layer capacitor that comprises a glass fiber, a polyester fiber, and an aramid fiber.

Because in accordance with such the separator for the electric double-layer capacitor it comprises the glass fiber and thereby has a hydrophilic group (for example, a siranol (Si—OH)) such as a hydroxyl group (—OH) in the separator, a preferable wetability for an electrolyte solvent such as propylene carbonate, which is strong in hydrophily, can be realized.

A second aspect of the present invention is, in the separator for the electric double-layer capacitor described in the first aspect of the invention, a separator for the electric double-layer capacitor that contains the glass fiber of not less than 10 mass percent and not more than 40 mass percent.

Because in accordance with such the separator for the electric double-layer capacitor contains the grass fiber of not less than 10 mass percent and not more than 40 mass percent, a preferable wetability for the electrolyte solvent such as the propylene carbonate, which is strong in hydrophily, can be realized.

A third aspect of the present invention is, in the separator for the electric double-layer capacitor described in any of the first and second aspects of the invention, a separator for the electric double-layer capacitor that contains the aramid fiber of not less than 40 mass percent and not more than 60 mass percent.

Because in accordance with such the separator for the electric double-layer capacitor it contains the aramid fiber of not less than 40 mass percent and not more than 60 mass percent and thereby has a preferable insulation property, an electric leak between electrodes disposed at both sides of separators can be prevented.

A fourth aspect of the present invention is, in the separator for the electric double-layer capacitor described in any of the first to third aspects of the invention, a separator for the electric double-layer capacitor that contains the polyester fiber of not less than 10 mass percent and not more than 30 mass percent.

Because in accordance with such the separator for the electric double-layer capacitor it contains the polyester fiber of not less than 10 mass percent and not more than 30 mass percent, a preferable retractility can be kept and a good workability can be realized.

A fifth aspect of the present invention is, in the separator for the electric double-layer capacitor described in any of the first to fourth aspects of the invention, a separator for the electric double-layer capacitor that comprises an acryl resin and a cation fixing reinforcement agent as binders for binding the glass fiber, the aramid fiber, and the polyester fiber, and is made into paper.

Because in accordance with such the separator for the electric double-layer capacitor it has the binders for binding and bonding the glass fiber, the aramid fiber, and the polyester fiber, they can be preferably bonded each other.

A sixth aspect of the present invention is, in the separator for the electric double-layer capacitor described in any of the first to fifth aspects of the invention, a separator for the electric double-layer capacitor whose surface density, that is, mass per area of separator, is not less than 10 g/m$^2$ and not more than 30 g/m$^2$, and thickness is not less than 20 μm and not more than 60 μm.

Because in accordance with such the separator for the electric double-layer capacitor the surface density is not less than 10 g/m$^2$ and not more than 30 g/m$^2$, the separator can be made a preferable thickness of not less than 20 μm and not more than 60 μm.

A seventh aspect of the present invention is a separator for the electric double-layer capacitor that comprises a fiber and an inorganic compound for forming hydrosol that adheres to a surface of the fiber.

Here, "the inorganic compound for forming the hydrosol" means that the inorganic compound can form sol with making water a dispersant. And the inorganic compound contributes to improve flexibility and retractility of the separator, thereby improving a workability and productivity thereof. However, the inorganic compound for forming the hydrosol is not limited to whether or not having formed the hydrosol in a state that the inorganic compound is contained in the separator.

In addition, the "hydrosol" makes a solid (inorganic compound) dispersion particles with making water the dispersant, that is, the "hydrosol" is a colloid (also called a colloid solution). As inorganic compounds for forming such the hydrosol are cited a silica ($SiO_2$), an alumina ($Al_2O_3$), and the like. Accordingly, the separator for the electric double-layer capacitor is preferable to comprise at least one kind out of the silica and the alumina.

In addition, the "fiber" is not specifically limited to its kind if applicable to the separator for the electric double-layer capacitor. In addition to the glass fiber, the aramid fiber, and the polyester fiber, as other fibers are cited, for example, a cellulose, a fluorine fiber, a PPS (PolyPhenylene Sulfide) fiber, and the like.

Because in accordance with such the separator for the electric double-layer capacitor it comprises the inorganic compound for forming the hydrosol, a preferable wetability for the electrolyte solvent such as propylene carbonate, which is strong in hydrophily, can be realized.

In addition, the inorganic compound is preferable to adhere to surfaces of the fibers, and furthermore, adhere thereto at an appropriate distance.

Thus the flexibility and the retractility as the separator for the electric double-layer capacitor are not lost, thereby the separator being able to be easily wound. In addition, the wetability for an electrolytic solution can be more heightened and a performance such as a liquid hold ratio can be improved.

An eighth aspect of the present invention is the separator for the electric double-layer capacitor described in the seventh aspect of the invention which separator contains the inorganic compound of not less than 1 mass percent and not more than 20 mass percent.

Because in accordance with such the separator for the electric double-layer capacitor the inorganic compound adheres to almost all areas of fiber surfaces of the separator at the appropriate distance, a surface area of the inorganic compound becomes large. Accordingly, the electrolyte solvent such as the propylene carbonate, which is strong in hydrophily, is held by the inorganic compound whose surface area and hydrophily are large and excellent, respectively. Thus the separator for the electric double-layer capacitor can bring out a preferable wetability.

A ninth aspect of the present invention is a separator for the electric double-layer capacitor described in any of the seventh and eighth aspects of the invention, wherein the inorganic compound comprises a particulate inorganic compound and a particle diameter thereof is not less than 1 nm and not more than 500 nm.

Because in accordance with such the separator for the electric double-layer capacitor the particulate inorganic compound, whose particle diameter is not less than 1 nm and not more than 500 nm, adheres to fiber surfaces, total surface area of the inorganic compound and the fiber surfaces is remarkably increased. Accordingly, the separator for the electric double layer capacitor can be made a preferable wetability for the electrolyte solvent such as the propylene carbonate that is strong in hydrophily.

A tenth aspect of the present invention is a separator for the electric double-layer capacitor described in any of the seventh and ninth aspects of the invention, wherein the fiber comprises at least the glass fiber, and total of the inorganic compound and the glass fiber is not less than 10 mass percent and not more than 50 mass percent.

In accordance with such the separator for the electric double-layer capacitor a more preferable wetability for the electrolyte solvent such as the propylene carbonate, which is strong in hydrophily, and a good mechanical strength can be realized.

An eleventh aspect of the present invention is an electric double-layer capacitor that comprises any of the separators for the electric double-layer capacitor described in any of the first and tenth aspects of the invention, Because in accordance with such the electric double-layer capacitor it comprises the separator that has a preferable wetability for the electrolyte solvent, ion movements between polarizable electrodes become to be actively and minutely performed, thereby a charging/discharging can be preferably repeated.

A twelfth aspect of the present invention is a manufacturing method of a separator for the electric double-layer capacitor which method comprises a mixing process for mixing a fiber and an inorganic compound that is dispersed with forming hydrosol; and a paper making process for making paper from the mixed fiber and inorganic compound.

In accordance with such the manufacturing method of the separator for the electric double-layer capacitor the fiber and the inorganic compound are uniformly mixed by mixing them by an appropriate means. Then by making paper from the fiber and the inorganic compound, the separator for the electric double-layer capacitor, where the inorganic compound is uniformly dispersed in the fiber and adheres thereto, can be made.

BRIEF DESCRIPTION OF THE DRAWINGS

FIG. 15 is a graph showing a relationship between a surface density and internal resistance of a separator for an electric double-layer capacitor related to the present invention.

FIG. 16 is a graph showing a relationship between a surface density and maximum pore size of a separator for an electric double-layer capacitor related to the present invention.

DESCRIPTION OF THE PREFERRED EMBODIMENTS

Here will be described embodiments of the present invention in detail, referring to FIGS. 1 to 3 as needed. However, the present invention is not limited to the embodiments below.

[Separator for Electric Double-layer Capacitor]

Figure 1:
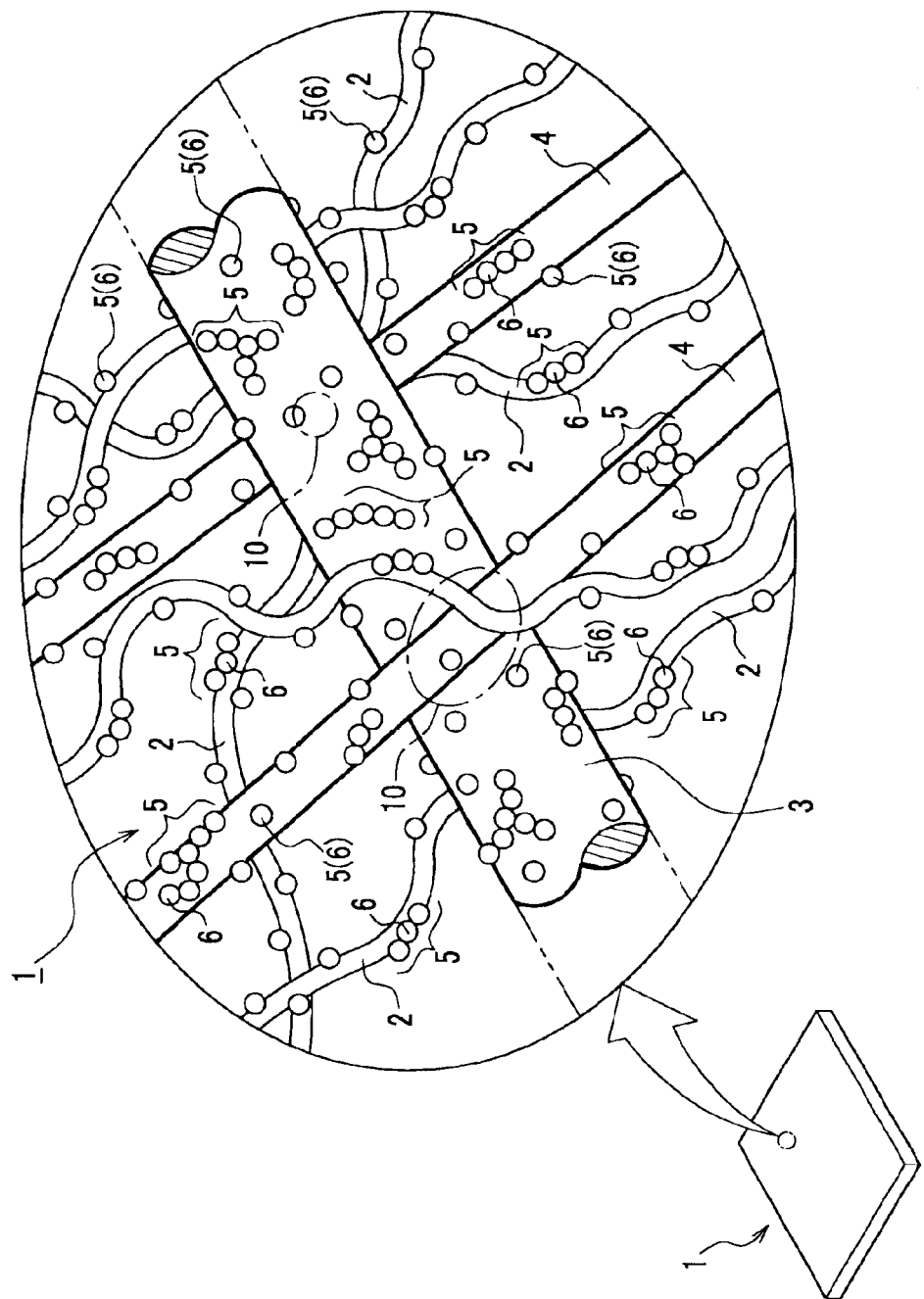
FIG. 1 is a drawing where a separator for an electric double-layer capacitor related to the present invention is enlarged and schematically shown.
Figure 2:
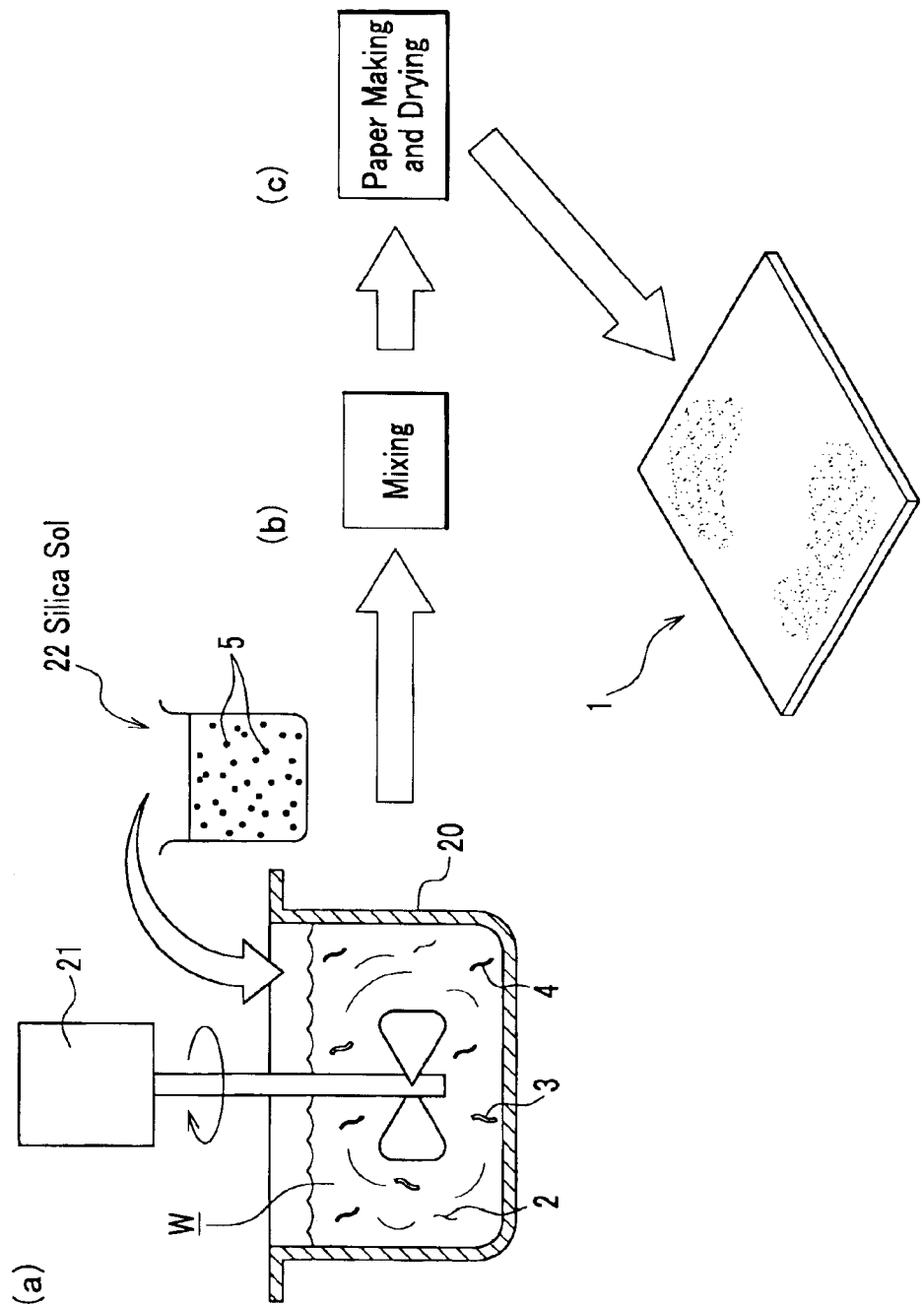
FIG. 2 is a process drawing showing a manufacturing process of a separator for an electric double-layer capacitor related to the present invention.

As shown in FIG. 1, a separator 1 for an electric double-layer capacitor (hereinafter abbreviated to the "separator") is configured of aramid fibers 2, polyester fibers 3, and glass fibers 4 bonded each other by binders (not shown); and furthermore, silicas 5 (an inorganic compound for forming hydrosol) adhere to a surface of each fiber in a dispersion state by the binders. Then the silicas 5 are formed with comprising minute particles of particulate silicas 6 (inorganic compound) and are a generic name of a silica that consists of single particulate silica 6 and adheres to the surface of each fiber; and another silica where the particulate silicas 6 are congregated and adhere to each fiber. Meanwhile, the silicas 5 may not be comprised in some case.

(a) Aramid Fiber

The aramid fibers 2 are also called an aromatic polyamide, are a polymer where aromatic groups bond in an amide bond, and are a material having a water repellency and an insulation property. The insulation property is preferably improved by the aramid fibers 2 being comprised in the separator 1, and an electric leak between electrodes disposed with opposing to the separator 1 is difficult to occur. In addition, the aramid fibers 2 are preferably a fiber that is fibrillated.

In addition, the aramid fibers 2 are preferably contained in the separator 1 by not less than 40 mass percent and not more than 60 mass percent. If a containment amount of the aramid fibers 2 is less than 40 mass percent, a maximum pore size formed in the separator 1 tends to become larger, thereby the insulation property resulting in lowering. On the other hand, if the containment amount of the aramid fibers 2 is more than 60 mass percent, a void content of the separator 1 decreases, thereby an ion permeation amount in an electrolytic solution also decreasing and an internal resistance of the separator 1 becoming high.

Here, the internal resistance is a resistance which ions in the electrolytic solution receive when moving within the separator 1. In addition, the void content is something for showing a porosity of a fiber occupying an apparent volume of the separator 1, and is calculated from a specific gravity of the fibers configuring the separator 1 and a density of the separator 1.

Accordingly, the aramid fibers 2 can be selected/used from conventionally known ones as needed, taking the conditions described above into consideration: for example, are cited Cornex (R) of a meta-aramid fiber (manufactured by Teijin Ltd.), Kevlar (R) of a para-aramid fiber (manufactured by DuPont), Towaron (R) (manufactured by Teijin Towaron B.V.), and the like.

(b) Polyester Fiber

The polyester fibers 3 are a synthetic fiber represented by a polyethylene terephthalate (PET fiber) that is synthesized from a terephthalic acid and an ethylene glycol, and are a material having the retractility and the insulation property. In addition, the polyester fibers 3 are preferably ones containing aromatic rings because they are excellent in heat resistance. And by the polyester fibers 3 being contained in the separator 1, the retractility of the separator 1 can be preferably improved. For example, because in manufacturing a winding capacitor the capacitor can be wound with giving more loads, the separator 1 results in being able to be easily deformed, depending on a shape of a container and a swelling of a polarizable electrode in containing the electrolytic solution.

In addition, the polyester fibers 3 are preferably not more than 0.33 dtex in denier. If the denier becomes more than 0.33 dtex, a pore diameter formed in the separator 1 becomes large, thereby the insulation property tending to deteriorate.

Furthermore, the polyester fibers 3 are preferable to be contained in the separator 1 by not less than 10 mass percent and not more than 30 mass percent. If a containment amount of the polyester fibers 3 is less than 10 mass percent, even the glass fibers 4 contained in the separator 1 together with the polyester fibers 3 are decreased, the separator 1 tends to become difficult to elongate. On the other hand, if the containment amount of the polyester fibers 3 is more than 30 mass percent, the pore diameter formed in the separator 1 becomes large, thereby the insulation property tending to deteriorate.

Accordingly, the polyester fibers 3 can be selected/used from conventionally known ones as needed, taking the conditions described above into consideration: for example, are cited Vectran (R) (manufactured by Kuraray Co., Ltd), Tepyrus (R) (manufactured by Teijin Ltd.), Unitika Ester (manufactured by Unitika Fiber Ltd.), Kuraray Polyester (manufactured by Kuraray Co., Ltd), and the like.

(c) Glass Fiber

Because the glass fibers 4 has the hydrophilic group containing such the siranol (Si—OH) that contains the hydroxyl group (—OH) and the like, they have a preferable wetability for the electrolytic solution and are a material having the insulation property and the heat resistance. Accordingly, by the glass fibers 4 being contained in the separator 1, the wetability thereof is heightened.

In addition, because the glass fibers 4 are a hard material, a size stability of the separator 1 is heightened by the glass fibers 4 being contained therein.

The glass fibers 4 are preferably not more than 2 $\mu$m in fiber diameter, and because if so, a surface area thereof increases, the wetability is improved and a pore size can be made small, thereby the electric leak becoming difficult to occur.

Furthermore, the glass fibers 4 is preferable to be contained in the separator 1 by not more than 40 mass percent, and more preferable if contained in a range of not less than 20 mass percent and not more than 30 mass percent. If contained more than 40 mass percent, the flexibility and retractility of the separator 1 lower. Accordingly, the workability tends to deteriorate.

Accordingly, the glass fibers 4 can be selected/used from conventionally known ones as needed, taking the conditions described above into consideration: for example, are cited EVANITE (manufactured by EVANITE GLASS FIBER CORP.), MANVILLE (manufactured by JOHNS MANVILLE CORP.), ECS (manufactured by Nippon Electric Glass Co., Ltd.), and the like.

(d) Silica

Because the silicas 5 (inorganic compound for forming the hydrosol) have the syranol group same as the glass fibers 4, they are a material whose wetability for the electrolyte solvent such as the propylene carbonate, which is high in hydrophily, is high. Accordingly, by the silicas 5 being contained in the separator 1 in a state where the silicas 5 have adhered to surfaces of the aramid fibers 2, the polyester fibers 3, and the glass fibers 4, the wetability of the separator 1 is heightened.

In addition, the silicas 5 are formed with containing the minute particulate silicas 6 (particulate inorganic compound). That is, as shown in FIG. 1, the silicas 5 have a silica that consists of single particulate silica 6 and adheres to a surface of each fiber; and another silica where a plurality of the particulate silicas 6 congregate, become like chains and films, and adhere to the surface of each fiber.

The silicas 5 adhere to the surfaces of the aramid fibers 2, the polyester fibers 3, and the glass fibers 4 with dispersing at an appropriate distance. Accordingly, total surface area of the silicas 5 becomes large compared to a surface area of each fiber. Furthermore, because the silicas 5 have high hydrophily as described above, it preferably improves the wetability of the separator 1.

In addition, by the silicas 5, whose wetability is high, being contained in the separator 1, an amount of the glass fibers 4 can be reduced. That is, a compounding amount of the glass fibers 4 contained in the separator 1 can be reduced by preferably adjusting an amount of the silicas 5 and the glass fibers 4, with keeping the wetability for the electrolytic solution as it is.

The silicas 5 are preferable to be contained in the separator 1 by not less than 1 mass percent and not more than 20 mass percent. If a mass of the silicas 5 is less than 1 mass percent for that of the separator 1, the wetability of the separator 1 for the electrolytic solution tends not to be improved; on the other hand, if the mass of the silicas 5 is more than 20 mass percent for that of the separator 1, there is a possibility that adjacent silicas 5 contact each other and become clusters.

A particle diameter of the particulate silicas 6 is sufficiently small for other fibers, the aramid fibers 2, the polyester fibers 3, and the glass fibers 4, for forming the separator 1 and is preferably in a range of not less than 1 nm and not more than 500 nm. If a diameter of the particulate silicas 6 is less than 1 nm, a surface area thereof becomes extremely small, thereby the wetability of the separator 1 being not able to tend to be heightened; on the other hand, if the diameter of the particulate silicas 6 is more than 500 nm, they cannot be preferably dispersed in a water solution, thereby an uneven adherence to a fiber surface occurring. To be more precise, for example, when the smallest fiber is the aramid fibers 2 and a fiber diameter thereof is 200 $\mu$m to 300 $\mu$m, the particle diameter of the particulate silicas 6 is preferably in a range of not less than 5 nm and not more than 30 nm that is approximately one tenth of the fiber diameter of the aramid fibers 2.

In addition, if the particle diameter of the particulate silicas 6 is sufficiently small, even when they adhere to the surface of each fiber, the wetability for the electrolytic solution can be improved without losing a function such as the retractility of each fiber itself; and furthermore, even when the particulate silicas 6 congregate and the silicas 5 like chains and like films covering the surface of each fiber are formed, the silicas 5 formed by being congregated are sufficiently small, compared to each fiber diameter, and therefore, a function of each fiber becomes difficult to be lost. Therefore, the particle diameter of the particulate silicas 6 is preferable to be small.

In addition, by the glass fibers 4 and the silicas 5 being contained in the separator 1, the wetability of the separator 1 can be further improved, compared to a case where the glass fibers 4 are independently contained.

Here, total mass of the silicas 5 and the glass fibers 4 (hereinafter abbreviated to the "total mass") is preferably not less than 10 mass percent and not more than 50 mass percent for the mass of the separator 1.

If the total mass is less than 10 mass percent, the wetability of the separator 1 for the electrolytic solution can tend to be difficult in improvement; on the other hand, if the total mass is more than 50 mass percent, the flexibility and retractility of the separator 1 tend to become lower.

(e) Binder

A binder (not shown) is something for binding and bonding the aramid fibers 2, the polyester fibers 3, and the glass fibers 4 in a state where they are intertwined each other, and making the silicas 5 adhere to the surface of each fiber. In the embodiment a known acryl resin and a cation fixing reinforcement agent are used. As acryl resins, are cited, for example, a styrene acrylic acid ester copolymer resin, a styrene acrylic acid alkyl copolymer resin, and the like; and as cation fixing reinforcement agents, can be selected a polyamide epichlorine resin, a polyamide epoxy resin, and the like.

(f) Surface Density

A surface density of the separator 1 is preferably not less than 10 g/m$^2$ and not more than 50 $\mu$m$^2$. If the surface density is less than 10 g/m$^2$, the productivity in making the separator 1 and the workability in making the electric double-layer capacitor tend to deteriorate; on the other hand, if the surface density is more than 50 g/m$^2$, a thickness of the separator 1 tends to become too thick, the workability in making the electric double-layer capacitor also tends to deteriorate, a housing efficiency into a capacitor container also deteriorates, and an internal resistance value becomes high.

Meanwhile, by making the thickness of the separator 1 not less than 15 $\mu$m and not more than 60 $\mu$m, the insulation property and the internal resistance value become good and the workability is also preferable, so the thickness is preferably not less than 15 $\mu$m and not more than 60 $\mu$m.

[Making Method of Separator for Electric Double-layer Capacitor]

Next, a making method (manufacturing method) of the separator 1 for the electric double-layer capacitor will be described, referring to FIG. 2.

(a) Inorganic Compound Addition Process

Fill a predetermined amount of water W in an appropriate container 20, keep a water temperature at a predesired temperature, and put the aramid fibers 2, the polyester fibers 3, and the glass fibers 4 in the container 20.

Then add silica sol 22 (hydrosol), where the silicas 5 (inorganic compound) are dispersed with making water a dispersant, in the container 20.

However, an addition order of each fiber and the silica sol 22 is not limited thereto and may be changed as needed. In addition, the silica sol 22 may not be added in some case.

In addition, the particulate silicas 6, which form the silicas 5 and disperse in the silica sol 22, are preferable to be 1 nm to 500 nm in diameter and to be uniformly dispersed in water. The silicas 5 disperse in a form of the single particulate silica 6 or with the particulate silicas 6 congregating and becoming like chains, depending on a concentration of the silicas 5 in the silica sol 22.

Such the silica sol 22 can be selected as needed and used from conventional known ones, and for example, are cited SNOWTEX (R) (manufactured by Nissan Chemical Industries Ltd.), SILICADOL (R) (manufactured by Nippon Chemical Industries Ltd.), and Quatron (R) (Fuso Chemical Co., Ltd.), and the like.

(b) Mixing Process

Then, mix the aramid fibers 2, the polyester fibers 3, the glass fibers 4, and the silicas 5 in the water W by a stirrer 21 so that they become uniform.

And add an appropriate amount of binders (not shown) in order to bond each fiber and the silicas 5, and furthermore, add an appropriate amount of a defoaming agent (not shown) so that a finish surface of the separator 1 becomes good. The defoaming agent can be selected as needed and used from known ones, and for example, are cited Pronal (R)

(manufactured by TOHO Chemical Industry Co., Ltd.), KM (Shin-Etsu Chemical Co., Ltd.), Foamless (R) (Meisei Chemical Works, Ltd.), and the like.

(c) Paper Making and Drying Process

Then after performing a stirring and a mixing for a predetermined time, make paper from slurry, where the aramid fibers 2, the polyester fibers 3, the glass fibers 4, the silicas 5, and the like are mixed, for example, by a hand paper making machine (square hand paper standard machine manufactured by Kumagai Riki Ltd.).

And by drying the paper with an appropriate dryer, the separator 1 for the electric double-layer capacitor can be made.

Thus by adding the silica sol 22 to the aramid fibers 2, the polyester fibers 3, and the glass fibers 4 with making the water W a dispersant, the silicas 5 can be well mixed with the aramid fibers 2 and the like. Accordingly, the separator 1, where the silicas 5 uniformly disperse and adhere at a preferable distance to the surfaces of the aramid fibers 2, the polyester fibers 3, and the glass fibers 4, can be made.

The separator 1 thus made can be suitably used for the electric double-layer capacitor.

[Electric Double-layer Capacitor]

Next, an electric double-layer capacitor comprising a separator related to the present invention will be described, referring to FIG. 3. Meanwhile, although the electric double-layer capacitor shown in FIG. 3 is a winding electric double-layer capacitor where the separator, electrodes, and the like are wound, the electric double-layer capacitor, where the separator related to the present invention is applicable, is not limited to the above, and other than this, for example, the separator is applicable to a stack electric double-layer capacitor, a button electric double-layer capacitor, and the like, selecting the capacitor therefrom as needed depending on a purpose/usage of the separator.

Figure 3:
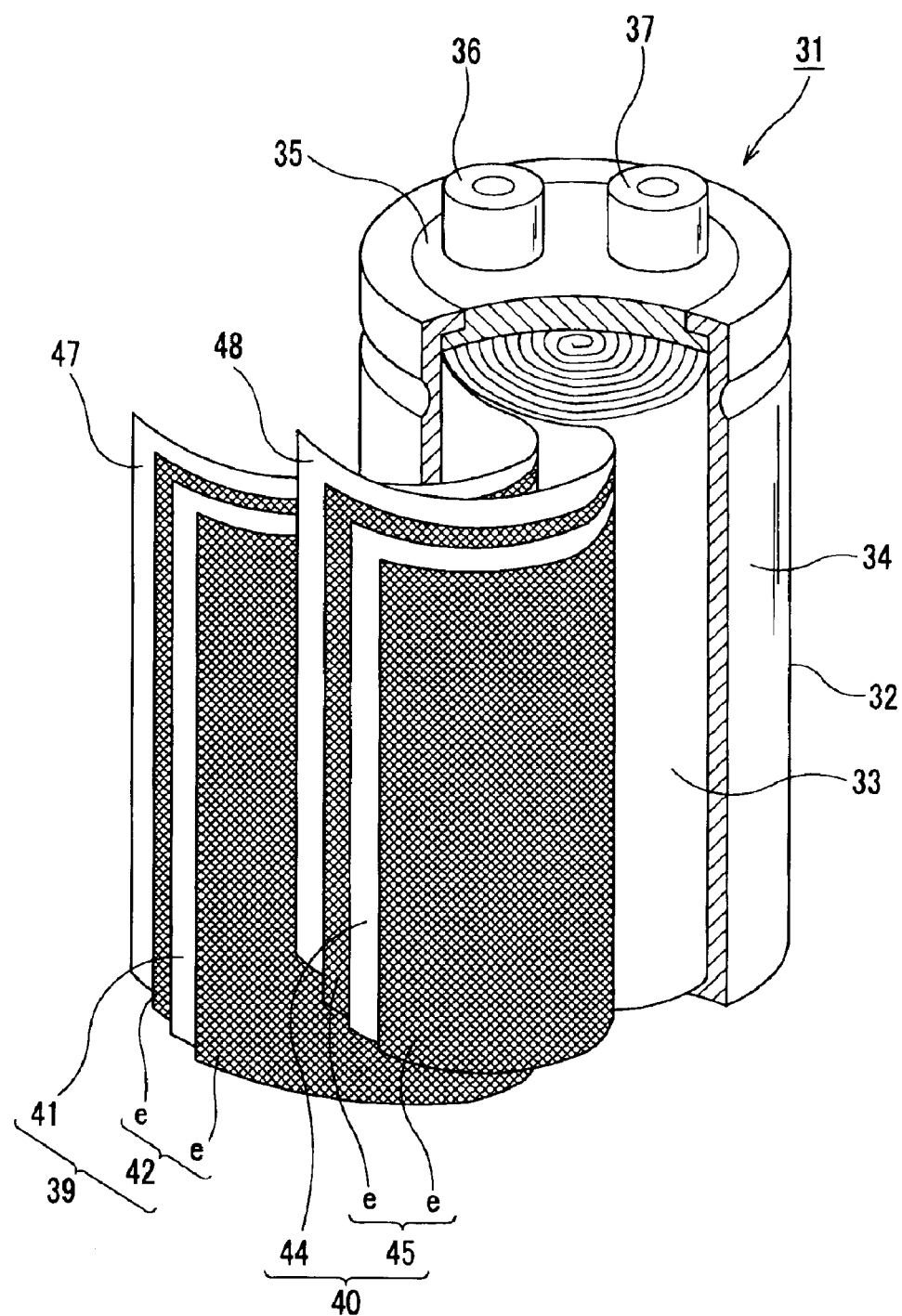
FIG. 3 is a drawing showing an example of an electric double-layer capacitor comprising a separator for the electric double-layer capacitor related to the present invention.

FIG. 3 shows an example of an electric double-layer capacitor. As shown in FIG. 3, an electric double-layer capacitor 31 is configured of, as main parts, a cylindrical container 32, an electrode winding body 33 that is housed in the container 32 and separated by band separators 47 and 48, and an electrolytic solution injected in the container 32.

The container 32 is preferably formed of, for example, aluminum (alloy) from reasons of an easy workability, lightness in weight, and the like. In addition, the container 32 is configured of a cylindrical main body 34 with a bottom and a terminal plate 35 for closing one end opening of the cylindrical main body 34, and on the terminal plate 35 are provided a positive terminal 36 and a negative terminal 37.

The electrode winding body 33 has a first band electrode 39 at a positive pole side and a second band electrode 40 at a negative pole side.

The first band electrode 39 is an electrode where each of band polarizable electrodes e is pasted with a conductive adhesive on both sides of a band current collector 41 consisting of an aluminum foil, and a band positive pole 42 is configured of the polarizable electrodes e at both sides. The polarizable electrodes e are also called an active charcoal electrode and molded into a sheet from an active charcoal powder, a carbon black, a tetrafluoroethylene powder, and the like. In addition, the second band electrode 40 next described is same.

The second band electrode 40 is an electrode where each of band polarizable electrodes e is pasted with a conductive adhesive on both sides of a band current collector 44 consisting of an aluminum foil, and a band negative pole 45 is configured of the polarizable electrodes e at both sides.

And the first band electrode body 39 at the positive pole side and the second band electrode body 40 at the negative pole side are separated by the separators 47 and 48 of the present invention. Because the separators 47 and 48 of the present invention are preferable in wetability for the electrolyte solvent such as the polypropylene carbonate that is strong in hydrophily, the electric double-layer capacitor 31 can preferably repeat a charging/discharging.

In addition, because the separators 47 and 48 of the present invention have a heat resistance endurable under a high temperature, they can be sufficiently dried before injecting the electrolytic solution. And because remaining moisture within the electric double-layer capacitor 31 can be made extremely little, the capacitor 31 becomes high in withstand voltage and energy density, and excellent in durability.

Furthermore, because the separators 47 and 48 of the present invention are light in surface density and thin in thickness, they can house the electrode winding body 33 more for a same volume and be made a large capacity.

Still furthermore, because the separators 47 and 48 of the present invention have flexibility, they can be easily wound along a shape of the container 32.

EXAMPLES

Here will be described separators related to the present invention further in detail, based on examples.

(a) Examples 1 to 3 and 11

In Table 1 is shown each physicality of separators (examples 1 to 3: surface density, 15 g/m$^2$; thickness, 50 μm) made so as to make total mass of aramid fibers, polyester fibers, and glass fibers 100 mass percent by making a polyester fiber compounding ratio constant, 30 mass percent, and changing a aramid fiber compounding ratio 60, 50, and 40 mass percent, and a glass fiber compounding ratio 10, 20, and 30 mass percent; a separator (example 11) whose surface density and thickness are made 20 g/m$^2$; thickness, 65 μm in the compounding ratio of the example 3; and conventional separators where the glass fibers are not contained (comparison example 1: aramid fibers, 70 mass percent; polyester fibers, 30 mass percent; surface density, 20 g/m$^2$; thickness, 65 μm; comparison example 2: aramid fibers, 70 mass percent; polyester fibers, 30 mass percent; surface density, 15 g/m$^2$; thickness, 50 μm).

Figure 6:
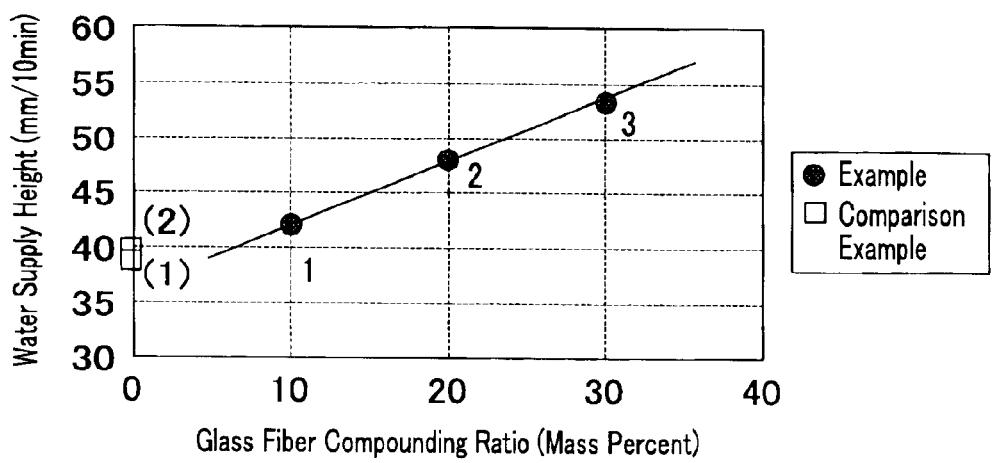
FIG. 6 is a graph showing a relationship between a glass fiber compounding ratio and water supply height of a separator for an electric double-layer capacitor related to the present invention.
Figure 7:
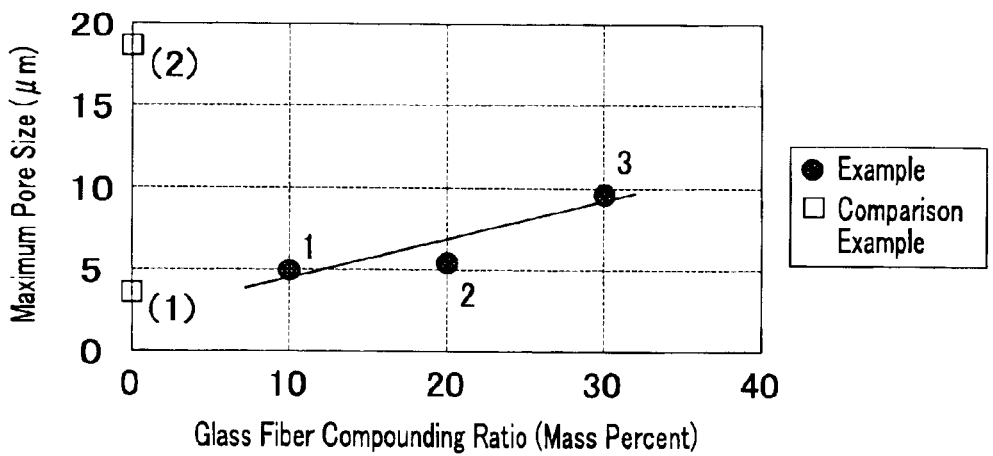
FIG. 7 is a graph showing a relationship between a glass fiber compounding ratio and maximum pore size of a separator for an electric double-layer capacitor related to the present invention.
Figure 17:
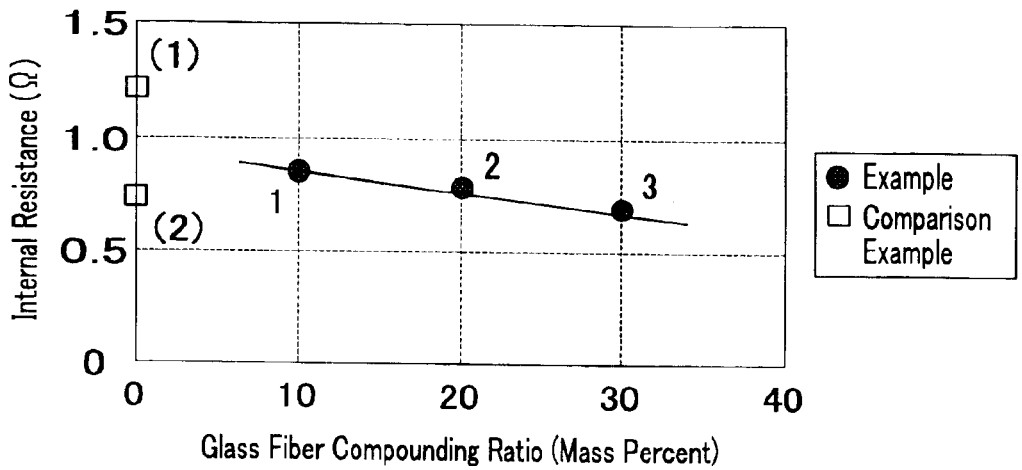
FIG. 17 is another graph showing a relationship between a glass fiber compounding ratio and internal resistance of a separator for an electric double-layer capacitor related to the present invention.

And in FIGS. 6, 7, and 17 are shown relationships between the glass fiber compounding ratio and a water supply height; the glass fiber compounding ratio and a maximum pore size; and the glass fiber compounding ratio and an internal resistance, respectively.

Meanwhile, a girth of the glass fibers used for the examples 1 to 3 is 0.8 μm. The polyester fibers used for the examples 1 to 3 and the comparison example 1 are 0.11 dtex in denier and 3 mm in fiber length. The aramid fibers are 0.2 μm to 0.3 μm in typical fiber diameter and 0.50 mm to 0.60 mm in typical fiber length.

In addition, for example, in FIG. 6 "1" described therein shows the physicality corresponding to the example 1, and "(2)" shows the physicality corresponding to the comparison example 2: it is same for other examples and comparison examples in other FIGS.

TABLE 1

| | | Example 1 | Example 2 | Example 3 | Example 11 | Comparison Example 1 | Comparison Example 2 |
|---|---|---|---|---|---|---|---|
| Compounding Ratio | Aramid fiber (mass percent) | 60 | 50 | 40 | 40 | 70 | 70 |
| | Polyester fiber (mass percent) | 30 | 30 | 30 | 30 | 30 | 30 |
| | Glass fiber (mass percent) | 10 | 20 | 30 | 30 | 0 | 0 |
| Physicality | Surface density (g/m$^2$) | 15 | 15 | 15 | 20 | 20 | 15 |
| | Thickness ($\mu$m) | 50 | 50 | 50 | 65 | 65 | 50 |
| | Average pore size ($\mu$m) | 1.1 | 1.3 | 1.9 | 1.5 | 0.8 | 1.0 |
| | Maximum pore size ($\mu$m) | 5.1 | 5.5 | 9.7 | 5.0 | 3.2 | 18.7 |
| | Tensile strength (N/15 mm) | 7.1 | 6.5 | 6.3 | 8.5 | 10.2 | 6.6 |
| | Tensile elongation (%) | 4.4 | 3.7 | 3.6 | 3.6 | 5.3 | 5.1 |
| | Water supply height (mm/10 min) | 42 | 48 | 53 | 52 | 38 | 40 |
| Separator Performance | Internal resistance ($\Omega$) | 0.79 | 0.75 | 0.66 | 0.85 | 1.18 | 0.71 |

Note:
For the polyester fiber, 0.11 dtex is used.

Meanwhile, in a measurement of each physicality of the separators shown in Table 1, that of the surface density is performed according to "JIS P 8124."

A measurement of the thickness is performed according to "JIS P 8118." The thinner the thickness is the more preferable the separators are because they can be housed in a container and the like in a larger amount.

Measurements of the tensile strength and the tensile elongation are performed according to "JIS P 8113." The higher each of the tensile strength and the tensile elongation is the more preferable the separators are because the workability thereof is better.

A measurement of the water supply height is performed according to "JIS P 8141." However, polypropylene carbonate is used as a solvent. The higher the water supply height is the more preferable the separators are because the wetability thereof is better for an electrolytic solution.

For a measurement of the internal resistance are prepared electrodes, where particle active charcoal, carbon black, and polytetrafluoroethylene are mixed and thoroughly kneaded; an aluminum foil as current collector electrodes; examples of the present invention and conventional comparison examples as separators; and an electrolytic solution where tetrafluoride boric acid tetraethyl ammonium is dissolved into propylene carbonate. Next, after making a coin-cell electric double layer capacitor with housing these materials within a jig made of aluminum for each separator, the internal resistance thereof is measured. The internal resistance is preferable to be lower because the lower the internal resistance is the smaller an energy loss of the electric double layer capacitor becomes.

Figure 4:
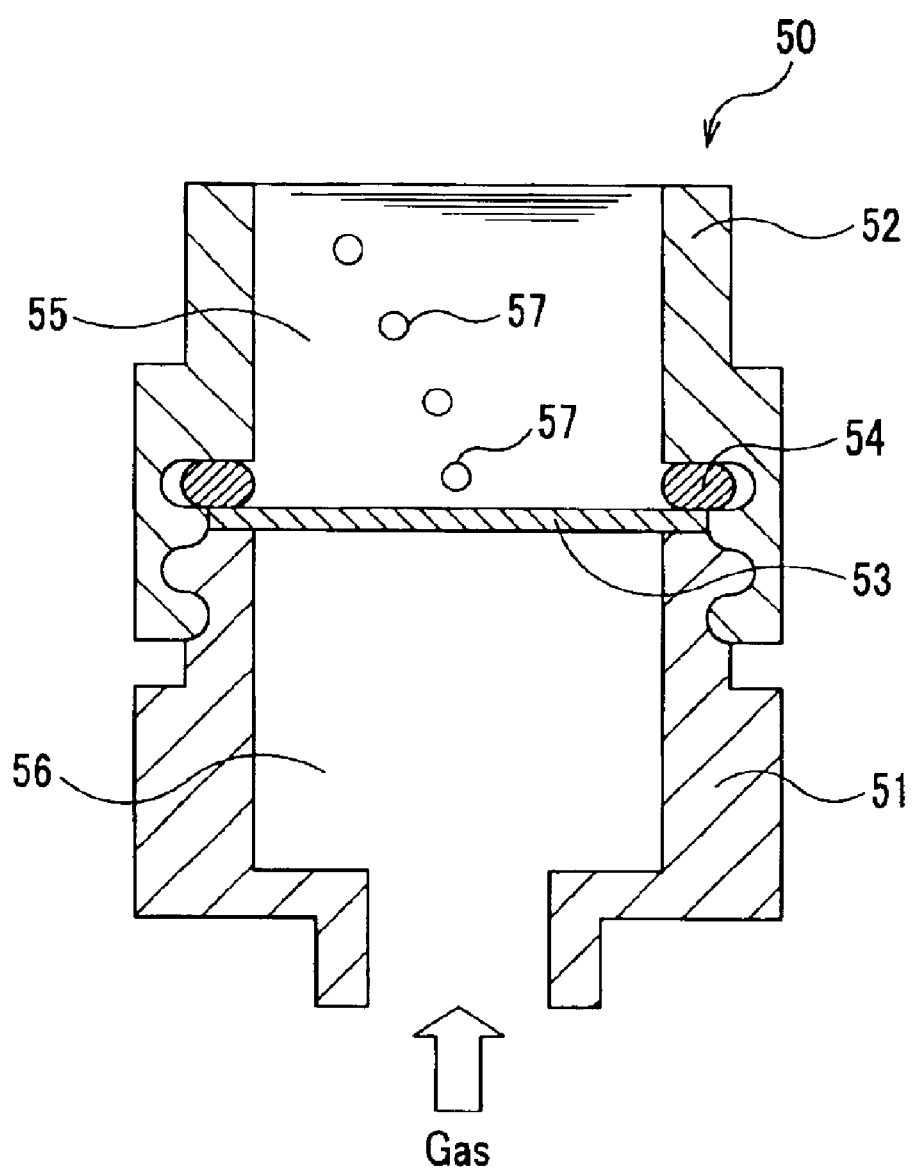
FIG. 4 is a drawing illustrating a measurement method of a pore size of a separator for an electric double-layer capacitor related to the present invention.
Figure 5:
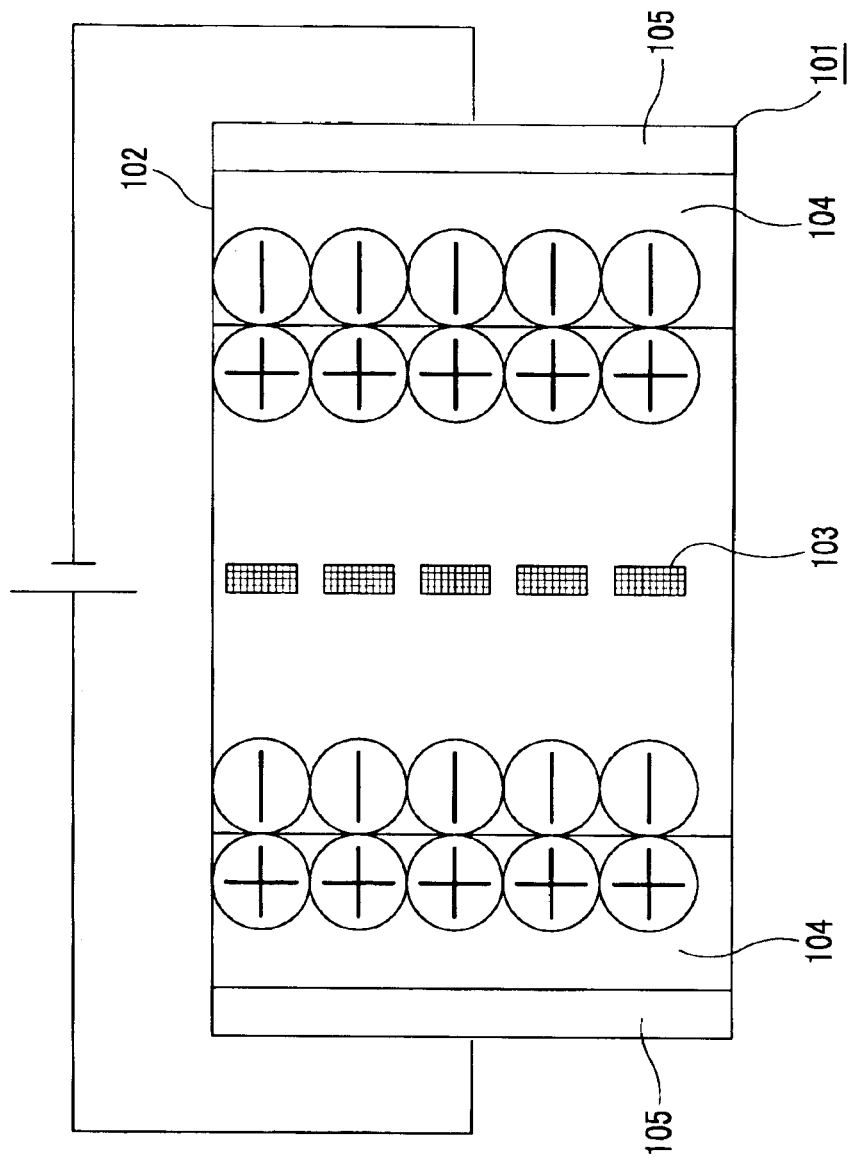
FIG. 5 is a drawing schematically showing an electric double-layer capacitor.

A pore size is measured by a bubble point method. The bubble point method is, as shown in FIG. 4, a method where a separator 53 of a test specimen is pinched with jigs 51 and 52 of a known porometer 50 through a packing 54 such as an O-ring; a gas is injected in a lower cavity 56 in a state where liquid such as water is filled in an upper cavity 55; bubbles, which occur by the gas passing through the separator 53, are checked with the porometer 50 (Automated Perm Porometer: manufactured by Porous Materials in the U.S.); and the pore size of the separator 53 is calculated according to a gas pressure and a surface tension of a liquid surface when the gas reaches a liquid surface as bubbles.

In addition, because the smaller a maximum pore size is, the higher the insulation property of separators become and a leak current between electrodes can be made small, the maximum pore size is preferable to be smaller.

From Table 1 and FIG. 6, as the glass fiber compounding ratio having hydrophily increases, the water supply height becomes high, so it turns out that the wetability of the separators is improved.

As shown in FIG. 17, this tendency accords with one that the internal resistance becomes small as the glass fiber compounding ratio contained in the separators increases.

From Table 1 and FIG. 7, comparing the examples 1 to 3 with the comparison example 2 that are all same in surface density, it turns out that the maximum pore sizes of the examples 1 to 3 significantly become small. This is thought to be derived from a fact that the examples 1 to 3 are made by mixing the glass fibers of a comparatively small fiber diameter, which is smaller than a fiber diameter of the polyester fibers and larger than that of the aramid fibers, compared to the comparison example 2 consisting of nothing but the aramid fibers and the polyester fibers, and making paper from them.

In other words, because the examples 1 to 3 contain the glass fibers whose fiber diameter is smaller than that of the polyester fibers and larger than that of the aramid fibers, all of the separators of the examples 1 to 3 are easily made more uniform than the comparison example 2 consisting of the aramid fibers and the polyester fibers when the separators of the examples 1 to 3 are formed; and as a result, even in a separator of a low surface density the maximum pore size can be made a small value.

Recognizing the importance of pore sizes of the comparison example 2 and the example 2, a tendency is apparent that all of the separators are easily uniformed by the glass fibers being contained therein. The example 2 is larger in an average pore size and far smaller in the maximum pore size, compared to the comparison example 2. That is, that the average pore size is large and the maximum pore size becomes small shows that the aramid fibers, the polyester fibers, and the glass fibers are more uniformly dispersed and the separator is uniformly formed.

The above tendency that the separators are easily uniformed by the glass fibers being contained becomes more apparent as shown in FIG. 16 by making a graph with making a horizontal axis the surface density and a vertical axis the maximum pore size.

From FIG. 16, if the glass fibers are mixed, it turns out that separators, whose maximum pore size is small and insulation property is excellent, can be obtained even in a same surface density, particularly in a region where the surface density is small.

In addition, from FIG. 7 described above, as the glass fiber compounding ratio increases, it turns out that the maximum pore size tends to become larger. As described above, although the maximum pore size can be made small by compounding the glass fibers, in the separators where the glass fibers are compounded the maximum pore size becomes large as the glass fiber compounding ratio is increased.

This is due to a decrease of the aramid fiber compounding ratio as the glass fiber compounding ratio increases because a fiber diameter of the glass fibers is a little bit larger than that of the aramid fibers that are used.

In other words, because the wetability and the pore sizes change in accordance with the glass fiber compounding ratio and the aramid fiber compounding ratio, it is requested to select the compounding ratios whose balance is good. In addition, it is desirable that the fiber diameters of the aramid fibers and the glass fibers are as small as possible.

Summarizing these results, when compounding the glass fibers, the maximum pore size becomes small, the wetability for the electrolytic solution can be heightened, and the maximum pore size can also be made significantly small in the region of the low surface density; however, as the glass fiber compounding ratio becomes high, the maximum pore size tends to become larger, and strength and elongation also tend to become lower.

Although the aramid fibers can make the maximum pore size of the separators small as the compounding ratio thereof is heightened, on the other hand, the wetability for the electrolytic solution lowers. Furthermore, if the polyester fiber compounding ratio is less, the strength and elongation of the separators tend to become lower, so the polyester fibers are requested to keep the strength and elongation of the separators.

The separators of the examples can be said to be optimum separators where the compounding ratio of each fiber is well balanced in the results previously described, that is, in wetability, maximum pore size, strength, and elongation.

(b) Examples 3 to 5

Figure 8:
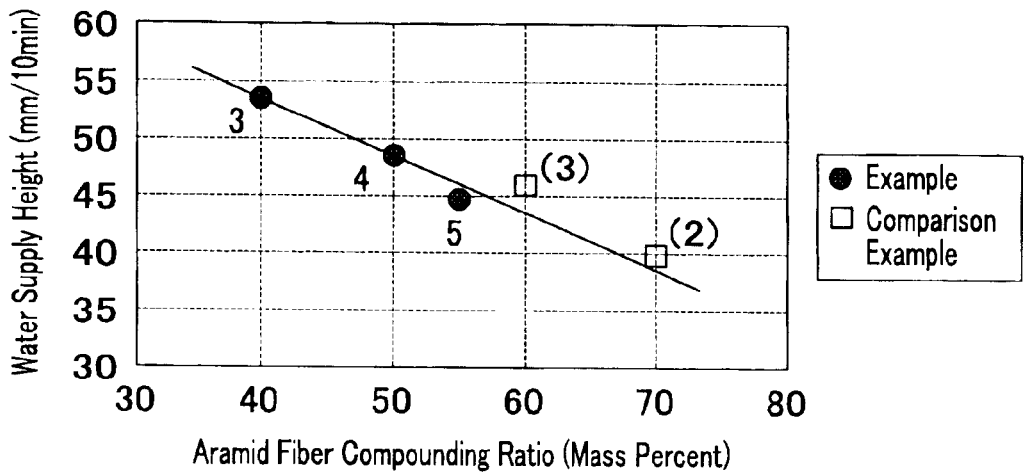
FIG. 8 is a graph showing a relationship between an aramid fiber compounding ratio and water supply height of a separator for an electric double-layer capacitor related to the present invention.
Figure 9:
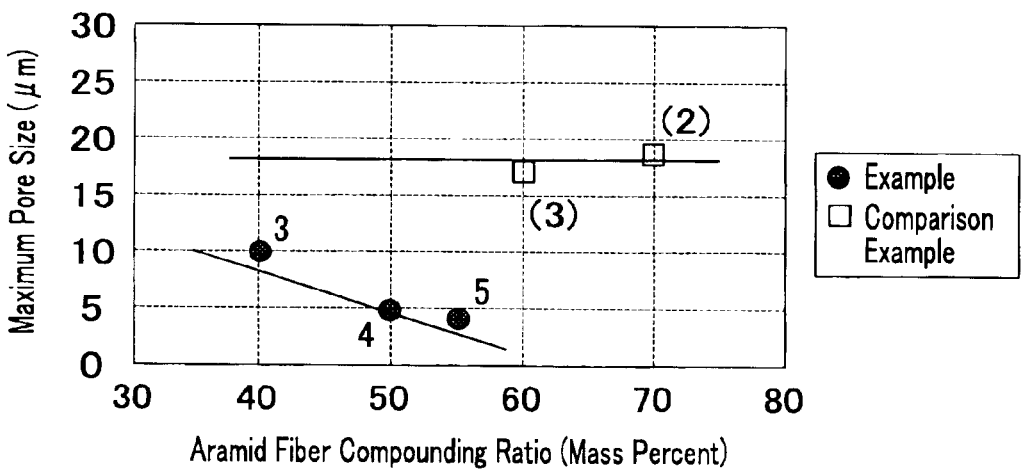
FIG. 9 is a graph showing a relationship between an aramid fiber compounding ratio and maximum pore size of a separator for an electric double-layer capacitor related to the present invention.

Next, in Table 2 is shown each physicality of separators (examples 3 to 5: surface density, 15 g/m$^2$; and thickness, 50 μm) made so as to make total mass of the aramid fibers, the polyester fibers, and the glass fibers 100 mass percent by making the glass fiber compounding ratio constant, 30 mass percent, and changing the aramid fiber compounding ratio 40, 50, and 55 mass percent, and the polyester fiber compounding ratio 30, 20, and 15 mass percent; the separators of the comparison example 2 described above and a comparison example 3 (aramid fibers, 60 mass percent; polyester fibers, 40 mass percent; surface density, 15 g/m$^2$; thickness, 50 μm). And in FIGS. 8 and 9 are shown relationships between the aramid fiber compounding ratio and the water supply height, and the aramid fiber compounding ratio and the maximum pore size, respectively.

Meanwhile, the glass fibers used for the examples 3 to 5 is 0.8 μm in girth and the polyester fibers is 0.11 dtex in denier and is 3 mm in fiber length. The aramid fibers are 0.2 μm to 0.3 μm in typical fiber diameter and 0.50 mm to 0.60 mm in typical fiber length.

TABLE 2

|  |  | Example 3 | Example 4 | Example 5 | Comparison Example 2 | Comparison Example 3 |
| --- | --- | --- | --- | --- | --- | --- |
| Compounding Ratio | Aramid fiber (mass percent) | 40 | 50 | 55 | 70 | 60 |
|  | Polyester fiber (mass percent) | 30 | 20 | 15 | 30 | 40 |
|  | Glass fiber (mass percent) | 30 | 30 | 30 | 0 | 0 |
| Physicality | Surface density (g/m$^2$) | 15 | 15 | 15 | 15 | 15 |
|  | Thickness(μm) | 50 | 50 | 50 | 50 | 50 |
|  | Average pore size (μm) | 1.9 | 1.2 | 1.2 | 1.0 | 1.3 |
|  | Maximum pore size (μm) | 9.7 | 4.6 | 4.1 | 18.7 | 17.2 |
|  | Tensile strength (N/15 mm) | 6.3 | 5.5 | 6.1 | 6.6 | 7.9 |
|  | Tensile elongation (%) | 3.6 | 2.8 | 2.8 | 5.1 | 6.4 |
|  | Water supply height (mm/10 min) | 53 | 48 | 44 | 40 | 46 |

TABLE 2-continued

|  |  | Example 3 | Example 4 | Example 5 | Comparison Example 2 | Comparison Example 3 |
|---|---|---|---|---|---|---|
| Separator Performance | Internal resistance ($\Omega$) | 0.66 | 0.87 | 0.90 | 0.71 | 0.72 |

Note:
For the polyester fiber, 0.11 dtex is used.

(c) Making Method of Example 4

Here, first, will be described a making method related to an example 4 shown in Table 2. Meanwhile, making methods related to other examples and comparison examples are same as for the example 4, their descriptions are omitted.

Fill water of 1.5 liter in a container, keep a water temperature at 45 degrees Celsius, put in a polyaramid pulp (aramid fibers) of 5.0 g and disperse it by an appropriate method. Furthermore, after putting in a glass fiber of 3.0 g and dispersing it, put in a polyester fiber of 2.0 g and disperse it.

Then move these to a stirring container and add defoaming agents of 0.5 g such as Pronal (manufactured by TOHO Chemical Industry Co., Ltd.), KM (Shin-Etsu Chemical Co., Ltd.), Foamless (R) (Meisei Chemical Works, Ltd.), and the like, and stir them.

Then after as a binder, adding a styrene acryl acid polyester copolymer resin (hereinafter abbreviated to the "resin") of 0.34 g and stirring it, as a cation fixing reinforcement agent (binder) add a polyamide epichlorohydrin of 2.0 g and stir it.

Thus slurry, where the aramid fibers, the glass fibers, the polyester fibers, and the like are mixed, is made into paper by the hand paper making machine (square hand paper standard machine manufactured by Kumagai Riki Ltd.), and a separator, whose surface density is 15 g/m² and thickness is 50 µm, is obtained.

Thus by making paper by a paper making machine and dispersing all fibers in the water, the mixed fibers can be more uniformly dispersed, a separator, where all fibers are uniformly intertwined, can be formed, and the strength and elongation of the separator can be improved because the resin can be fixed in a state, where it is uniformly intertwined with all fibers thanks to a use of the resin and the cation fixing reinforcement agent as the binders, when the fibers are dispersed in the water.

Figure 14:
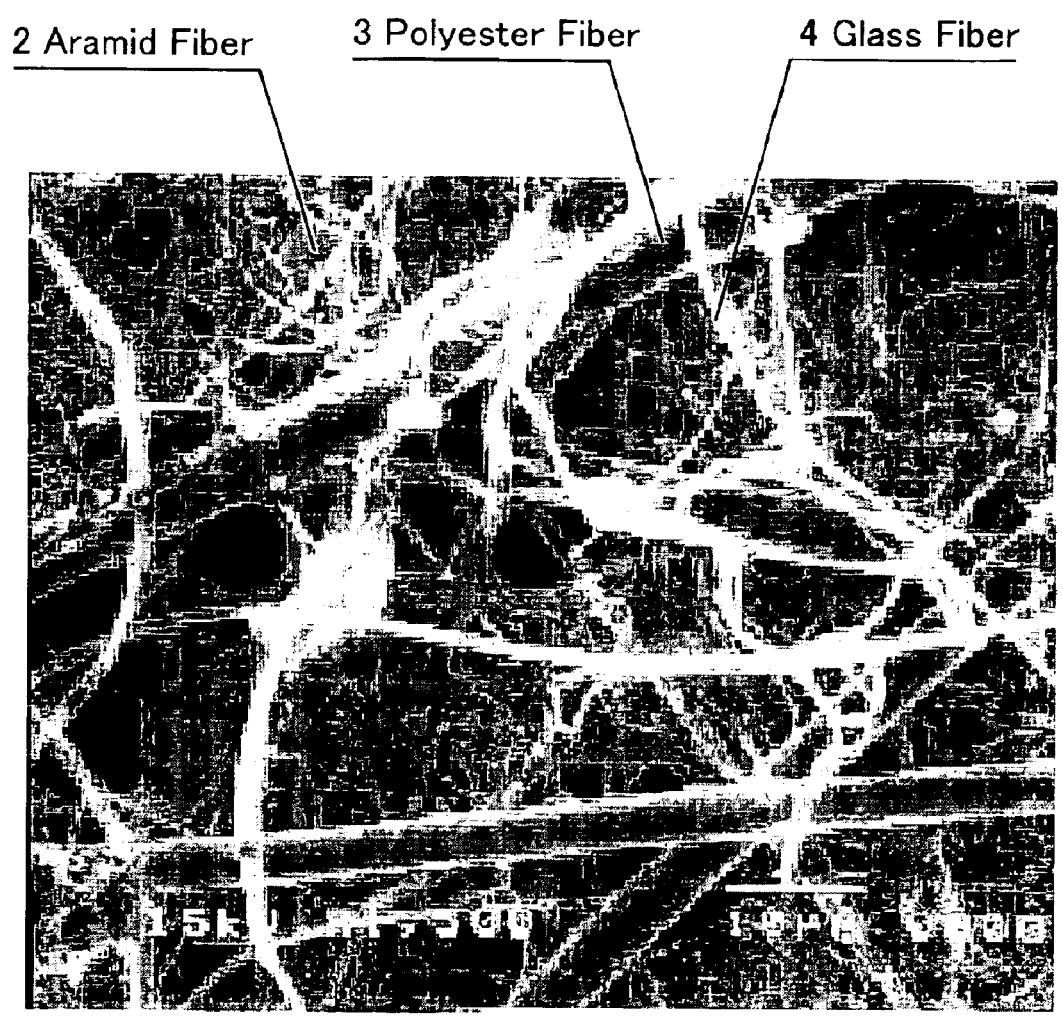
FIG. 14 is a photo of a separator by a scanning electronic microscope for an electric double-layer capacitor related to the present invention.

In addition, a photo of the separator by a scanning electronic microscope (SEM) related to the example 4 is shown in FIG. 14.

As shown in FIG. 14, it turns out that the separator is configured, with the aramid fibers 2, the polyester fibers (PET fibers) 3 whose fiber diameter is comparatively large, and the glass fibers 4 whose fiber diameter is smaller than that of the polyester fibers 3 and larger than that of the aramid fibers 2 being intertwined and bonded each other.

From Table 2 and FIG. 8, it turns out that in the separators of the examples 3 to 5 the water supply height tends to become lower as the aramid fiber compounding ratio increases.

In addition, from Table 2 and FIG. 9, it turns out that in the separators of the examples 3 to 5 the maximum pore size tends to become smaller as the aramid fiber compounding ratio increases.

On the other hand, as shown in FIG. 9, in the separators of the comparison examples 2 and 3, the maximum pore size is large as it is in the surface density of 15 g/m² without depending on the aramid fiber compounding ratio.

(d) Examples 6 to 8 and 12

In Table 3 is shown each physicality of separators (examples 6 to 8: surface density, 15 g/m²; thickness, 50 µm) made so as to make total mass of the aramid fibers, the polyester fibers, and the glass fibers 100 mass percent by making the polyester fiber compounding ratio of a different kind of polyester fibers (denier, 0.22 dtex; and fiber length, 3 mm) from the polyester fibers used for the examples 1 to 3 (denier, 0.11 dtex; and fiber length, 3 mm) constant, 30 mass percent, and changing the aramid fiber compounding ratio 60, 50, and 40 mass percent, and the glass fiber compounding ratio 10, 20, and 30 mass percent, same as in the examples 1 to 3; a separator of an example 12 described later; and conventional separators where no glass fibers are contained (comparison example 4: aramid fibers, 70 mass percent; polyester fibers, 30 mass percent; surface density, 20 g/m²; and thickness, 60 µm; comparison example 5: aramid fibers, 70 mass percent; polyester fibers, 30 mass percent; surface density, 15 g/m²; and thickness, 50 µm).

And in FIGS. 10, 11, 12, and 13 are shown relationships between the glass fiber compounding ratio and the water supply height; the glass fiber compounding ratio and the maximum pore size; the glass fiber compounding ratio and the tensile elongation; and the glass fiber compounding ratio and the internal resistance, respectively.

Meanwhile, the glass fibers used for the examples 6 to 8 is 0.8 µm in girth. The aramid fibers are 0.2 µm to 0.3 µm in the typical fiber diameter and 0.50 mm to 0.60 mm in the typical fiber length. In addition, same as in the examples 1 to 5, the surface density is made constant, 15 g/m², and the thickness is designed to be 50 µm.

The example 12 is made same in a compounding ratio of each fiber as in the example 6 and is made so that the surface density becomes 20 g/m² and the thickness becomes 50 µm. In addition, the example 12 is made as follows:

(e) Making Method of Example 12

First, fill water of 1.2 m³, whose temperature is made not more than 45 degrees Celsius, in a dispersion tank; put in an aramid fiber of 10 kg, whose typical fiber diameter and typical fiber length are 0.2 µm to 0.3 µm and 0.50 mm to 0.60 mm, respectively, and which aramid fiber is fibrillated, and disperse it; then put in a glass fiber of 1.7 kg, whose average fiber diameter is 0.8 µm, in the dispersion tank; and then furthermore, put in a polyester fiber of 5 kg whose denier and fiber length are 0.22 dtex and 3 mm, respectively, and sufficiently disperse them.

Figure 18:
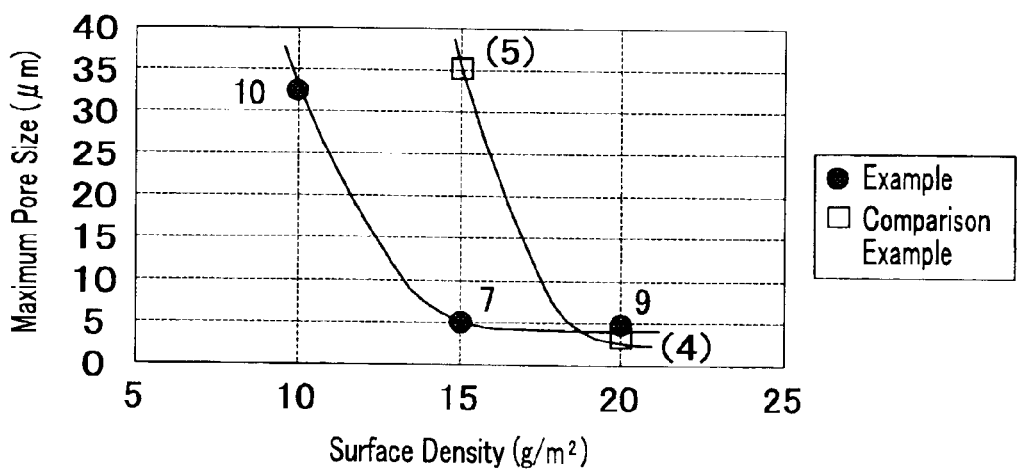
FIG. 18 is another graph showing a relationship between a surface density and maximum pore size of a separator for an electric double-layer capacitor related to the present invention.
Figure 19:
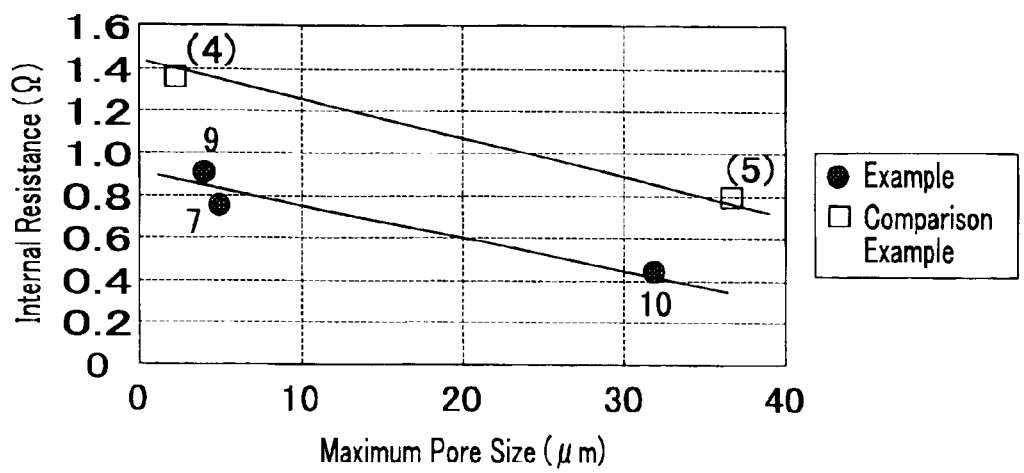
FIG. 19 is a graph showing a relationship between a maximum pore size and internal resistance of a separator for an electric double-layer capacitor related to the present invention.

Then, send these to a stirring tank and add a defoaming agent of 0.083 kg; and then add a styrene acrylic acid ester copolymer resin of 0.6 kg. And furthermore, add a polyamide epichlorohydrin of 0.3 kg as the cation fixing reinforcement agent; sufficiently disperse these in the water; and adjust slurry to a predetermined mixing ratio of the aramid fibers, 60 mass percent; the glass fibers, 10 mass percent; and the polyester fibers, 30 mass percent. Next, guide the slurry to a circular net paper making machine and make paper, thereby making a separator (example 12) for the electric double-layer capacitor.

tively. And in FIG. 15 a relationship between the surface density and internal resistance of the examples 7, 9, and 10 is shown in conjunction with the comparison examples 4 and 5. In addition, in FIGS. 18 and 19 are shown relationships between the surface density and the maximum pore size, and the maximum pore size and the internal resistance, respectively.

Meanwhile, the glass fibers used for the examples 7, 9, and 10 is 0.8 $\mu$m in girth, the polyester fibers are 0.22 dtex in denier and 3 mm in fiber length. The aramid fibers are 0.2

TABLE 3

|  |  | Example 6 | Example 7 | Example 8 | Example 12 | Comparison Example 4 | Comparison Example 5 |
|---|---|---|---|---|---|---|---|
| Compounding Ratio | Aramid fiber (mass percent) | 60 | 50 | 40 | 60 | 70 | 70 |
|  | Polyester fiber (mass percent) | 30 | 30 | 30 | 30 | 30 | 30 |
|  | Glass fiber (mass percent) | 10 | 20 | 30 | 10 | 0 | 0 |
| Physicality | Surface density (g/m$^2$) | 15 | 15 | 15 | 20 | 20 | 15 |
|  | Thickness($\mu$m) | 50 | 50 | 50 | 50 | 60 | 50 |
|  | Average pore size ($\mu$m) | 1.0 | 1.1 | 1.9 | 0.5 | 0.7 | 0.9 |
|  | Maximum pore size ($\mu$m) | 8.5 | 5.2 | 10.0 | 1.5 | 3.0 | 35.7 |
|  | Tensile strength (N/15 mm) | 7.4 | 6.5 | 6.8 | 1.3 | 10.9 | 8.4 |
|  | Tensile elongation (%) | 5.0 | 4.0 | 4.0 | 3.8 | 5.2 | 5.6 |
|  | Water supply height (mm/10 min) | 42 | 47 | 52 | 29 | 38 | 39 |
| Separator Performance | Internal resistance ($\Omega$) | 0.83 | 0.74 | 0.62 | 0.86 | 1.34 | 0.80 |

Note:
For the polyester fiber, 0.22 dtex is used.

Figure 10:
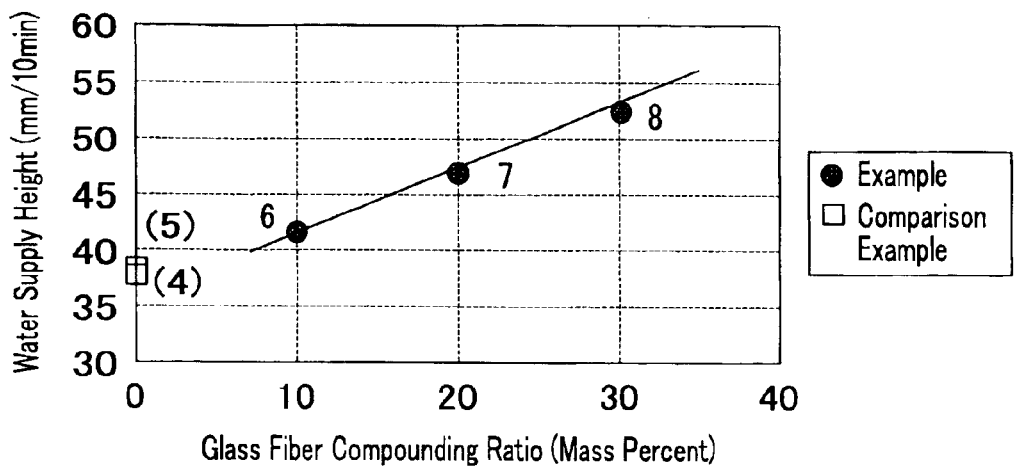
FIG. 10 is another graph showing a relationship between a glass fiber compounding ratio and water supply height of a separator for an electric double-layer capacitor related to the present invention.

From Table 3 and FIG. 10, even if the denier (fiber diameter) of the polyester fibers is different, it turns out same as in the examples 1 to 3 shown in Table 1 that the water supply height tends to become high as the glass fiber compounding ratio increases.

In addition, comparing the examples 6 to 8 with the comparison examples 4 and 5, it turns out that the water supply height tends to become high by the glass fibers being contained in the separators.

Figure 11:
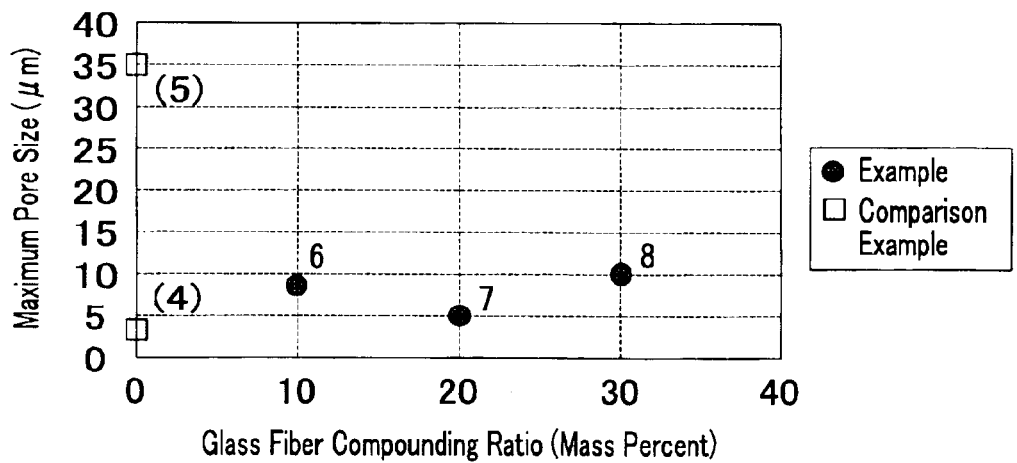
FIG. 11 is another graph showing a relationship between a glass fiber compounding ratio and maximum pore size of a separator for an electric double-layer capacitor related to the present invention.

From Table 3 and FIG. 11, it turns out that the maximum pore size tends to become larger as the glass fiber compounding ratio increases.

Figure 12:
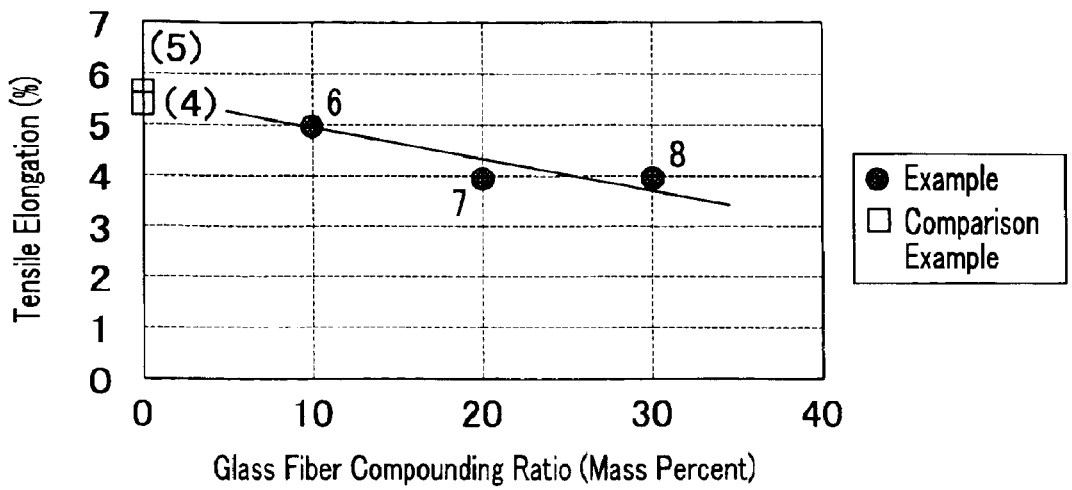
FIG. 12 is a graph showing a relationship between a glass fiber compounding ratio and tensile elongation of a separator for an electric double-layer capacitor related to the present invention.
Figure 13:
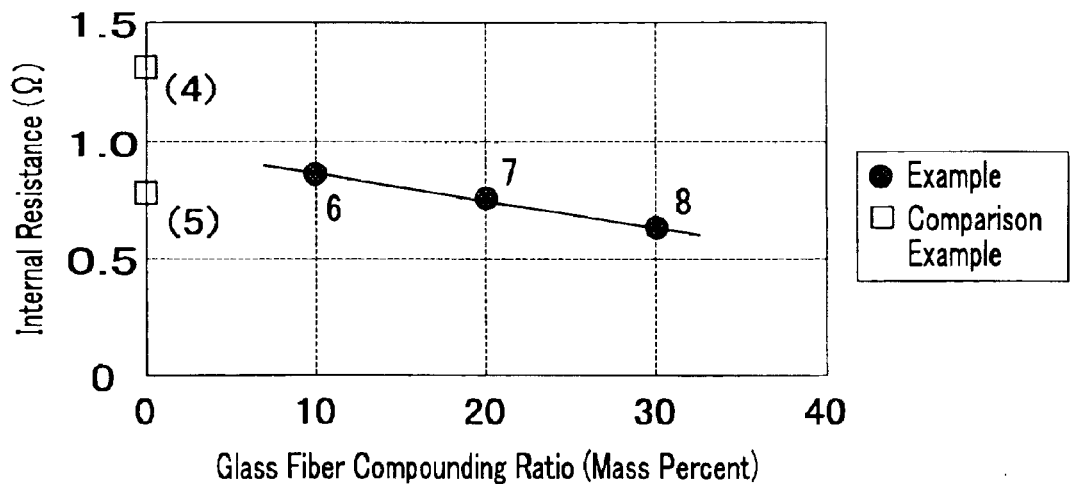
FIG. 13 is a graph showing a relationship between a glass fiber compounding ratio and internal resistance of a separator for an electric double-layer capacitor related to the present invention.

In addition, from Table 3, and FIGS. 12 and 13, it turns out that the tensile elongation and internal resistance of the separators tend to become lower as the glass fiber compounding ratio increases.

(f) Examples 7, 9, and 10

In Table 4 in conjunction with the comparison examples 4 and 5 is shown each physicality of separators (examples 7, 9, and 10) made by changing the surface density 15, 20, and 10 g/m$^2$ of separators whose aramid fibers composition ratio, polyester fiber compounding ratio and glass fiber compounding ratio, are 50, 30, and 20 mass percent, respec- $\mu$m to 0.3 $\mu$m in the typical fiber diameter and 0.50 mm to 0.60 mm in the typical fiber length.

From Table 4, it turns out that the thickness of the separators can be made thinner by making the surface density thereof smaller.

In addition, from FIG. 15 in turns out that the separators of the present invention are lower in the internal resistances in a same surface density, compared to the comparison examples.

In addition, from FIG. 18 in accordance with the separators of the present invention, it turns out that even if the surface density is made smaller, the separators whose maximum pore sizes are smaller can be obtained.

In addition, from FIG. 19 in accordance with the separators of the present invention, the separators whose internal resistances are lower can be formed while making the maximum pore size smaller.

TABLE 4

|  |  | Example 7 | Example 9 | Example 10 | Comparison Example 4 | Comparison Example 5 |
|---|---|---|---|---|---|---|
| Compounding Ratio | Aramid fiber (mass percent) | 50 | 50 | 50 | 70 | 70 |
|  | Polyester fiber (mass percent) | 30 | 30 | 30 | 30 | 30 |
|  | Glass fiber (mass percent) | 20 | 20 | 20 | 0 | 0 |
| Physicality | Surface density (g/m$^2$) | 15 | 20 | 10 | 20 | 15 |
|  | Thickness($\mu$m) | 50 | 60 | 35 | 60 | 50 |
|  | Average pore size ($\mu$m) | 1.1 | 1.3 | 2.4 | 0.7 | 0.9 |
|  | Maximum pore size ($\mu$m) | 5.2 | 4.6 | 32.3 | 3.0 | 35.7 |
|  | Tensile strength (N/15 mm) | 6.5 | 10.1 | 4.1 | 10.9 | 8.4 |
|  | Tensile elongation (%) | 4.0 | 5.7 | 2.8 | 5.2 | 5.6 |
|  | Water supply height (mm/10 min) | 47 | 46 | 48 | 38 | 39 |
| Separator Performance | Internal resistance ($\Omega$) | 0.74 | 0.90 | 0.45 | 1.34 | 0.80 |

Note:
For the polyester fiber, 0.22 dtex is used.

(g) Examples 13, 14, and 15

Figure 20:
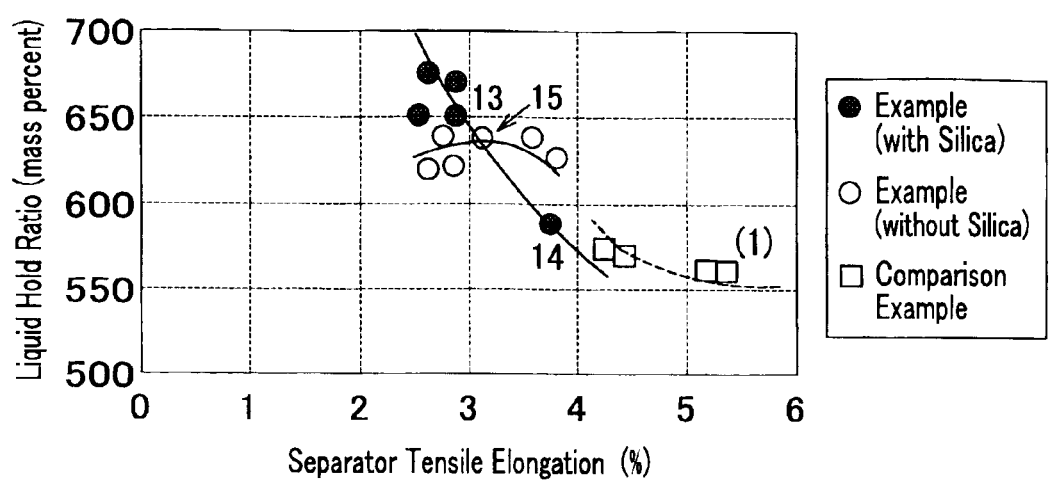
FIG. 20 is a graph showing a relationship between a liquid hold ratio and tensile elongation of a separator for an electric double-layer capacitor related to the present invention.

In Table 5 is shown each physicality of a separator (example 13) that contains an aramid fiber, polyester fiber, glass fiber, and silica of 50, 20, 20, and 10 mass percent in their compounding ratios, respectively, and total thereof is designed to be 100 mass percent; another separator (example 14) that contains an aramid fiber, polyester fiber, and silica of 64, 27, and 9 mass percent in their compounding ratios, respectively, and total thereof is designed to be 100 mass percent; still another separator (example 15) that contains an aramid fiber, polyester fiber, glass fiber of 50, 20, and 30 mass percent in their compounding ratios, respectively, without containing the silica; and a conventional separator not containing the silica (comparison example 6: the aramid fiber compounding ratio, and 70 mass percent; the polyester fiber compounding ratio, 30 mass percent). And FIG. 20 shows a relationship between a liquid hold ratio and a tensile elongation.

Meanwhile, the aramid fibers used for the examples 13 to 15 and the comparison example 6 are 0.2 $\mu$m to 0.3 $\mu$m in the typical fiber diameter and 0.50 mm to 0.60 mm in the typical fiber length. The polyester fibers used for the examples 13 to 15 and the comparison example 6 are 0.11 dtex and 3 mm in fiber diameter and fiber length, respectively. The glass fibers used for the examples 13 and 15 are 0.8 $\mu$m in fiber diameter. In addition, the surface density of the separators is made constant, 20 g/m$^2$ and the thickness thereof is designed to be about 60 $\mu$m.

Furthermore, with respect to a silica sol used for making the example 13, a particle diameter of particulate silicas in the silica sol is 10 nm to 20 nm by the BET (Brunauer, Emmett, and Teller) method.

TABLE 5

|  |  | Example 13 | Example 14 | Example 15 | Comparison Example 6 |
|---|---|---|---|---|---|
| Compounding Ratio | Aramid fiber (mass percent) | 50 | 64 | 50 | 70 |
|  | Polyester fiber (mass percent) | 20 | 27 | 20 | 30 |
|  | Glass fiber (mass percent) | 20 | 0 | 30 | 0 |
|  | Silica (mass percent) | 10 | 9 | 0 | 0 |
| Physicality | Surface density (g/m$^2$) | 20 | 20 | 20 | 20 |
|  | Thickness($\mu$m) | 60 | 55 | 60 | 60 |
|  | Maximum pore size ($\mu$m) | 3.2 | 3.3 | 4.1 | 3.2 |
|  | Tensile strength (N/15 mm) | 7.6 | 6.9 | 8.4 | 10.2 |
|  | Tensile elongation (%) | 2.9 | 3.8 | 3.1 | 5.3 |
|  | Ash (%) | 26.9 | — | 27.9 | 0.448 |
|  | Liquid hold ratio (%) | 650 | 590 | 640 | 560 |

TABLE 5-continued

|  | Example 13 | Example 14 | Example 15 | Comparison Example 6 |
|---|---|---|---|---|
| Internal resistance (Ω) | 0.82 | — | 0.93 | 1.18 |
| Voltage keep ratio (%) | 91 | — | 90 | — |

Meanwhile, in Table 5 a measurement of the ash is performed according to "JIS P 8128." The measured value corresponds to total amount of the glass fibers and the silicas in the silica sol contained in the separators.

For a measurement of the liquid hold ratio, measure a weight (W1) of a separator cut out in a constant area, dip it in an electrolytic solution where tetrafluoride boric acid tetraethyl ammonium is dissolved into propylene carbonate and adjusted, then take out a specimen in question with pincers, and leave it with being suspended for a constant time. And after being left, measure a weight (W2) of the separator and obtain the liquid hold ratio (%) according to the following equation:

$$\text{Liquid hold ratio }(\%) = 100 \times [(W2-W1)/W1]. \quad (1)$$

Because the higher the liquid hold ratio is the lower the internal resistance tends to become, the liquid hold ratio is preferable to be higher.

For a measurement of the voltage keep ratio, charge a coin-cell electric double-layer capacitor, where the internal resistance is measured, until a potential difference (V1) between positive and negative electrodes becomes constant; then measure a potential difference (V2) between the positive and negative electrodes after being left in an insulation state for a constant time; and express a ratio (V2/V1) of the potential differences in percent direct after the charge.

Because the higher the voltage keep ratio is the less an energy loss of an electric double-layer capacitor becomes, the voltage keep ratio is preferable to be higher.

Meanwhile, other physicality is measured by same methods as described before.

(h) Making Method of Example 13

Fill water of 1.5 liter in a appropriate container, keep a water temperature at 45 degrees Celsius, put in a polyaramid pulp (aramid fibers) of 5.0 g, subsequently put in a glass fiber of 2.0 g, stir them, and then put in a polyester fiber of 2.0 g and stir it.

Then, add silica sol so that its solid mass becomes 1.0 g and then furthermore, stir them.

Then, move them to a stirring container, add a binder and defoaming agent of each 0.5 g, and stir them.

And make paper from slurry where the aramid fiber, the glass fiber, the polyester fiber, the silica sol and the like are mixed, dry it, and thus make a separator whose surface density and thickness are 20 g/m$^2$ and 60 μm, respectively.

In accordance with Table 5, because the example 13, where the silica is compound, is higher in the liquid hold ratio, lower in the internal resistance, and higher in the voltage keep ratio, compared to the example 15 and the comparison example 6, it turns out that the wetability for the electrolytic solution is preferably improved in the example 13.

In addition, referring to FIG. 20 with recognizing the importance of the liquid hold ratio and tensile elongation of Table 5, although in a method for increasing the glass fiber as in the comparison example 6 to the example 15 the tensile strength is remarkably lowered as the glass fiber compounding ratio increases, it is inferred that there is a limitation value (about 640%) in an increase of the liquid hold ratio; whereas in the examples 13 and 14, the liquid hold ratio increases while suppressing a lowering of the tensile strength as little as possible, and there is no limitation value, too.

In addition, in accordance with Table 5 and FIG. 20, with respect to the example 14 where parts of the aramid fibers and polyester fibers of the comparison example 6 are replaced with the silicas, it turns out that the liquid hold ratio is higher than the comparison example 6. Thus, even when the glass fibers are not compounded, it turns out that the wetability for the electrolytic solution is improved by the silicas being compounded.

Furthermore, in accordance with Table 5 it turns out that the tensile strength of the example 13, where a part of the glass fibers is replaced with the silicas, does not largely lower.

Thus with respect to the separators where fibers such as the glass fibers, which are preferable in the wetability, are compounded, the liquid hold ratio thereof can be improved while suppressing the lowering of the tensile elongation and the tensile strength by further compounding the silicas and replacing the glass fibers and the like with the silicas.

That is, it turns out that other kinds of the separators of the present invention containing the silicas can ensure the preferable wetability while suppressing the lowering of the tensile strength as little as possible.

Thus, although the embodiments of the present invention are described, the invention is not limited thereto and variations are available without departing from the spirit and scope of the invention.

Although in the embodiments the fibers configuring the separator 1 are assumed to be the aramid fibers 2, the polyester fibers 3, and the glass fibers 4, combinations and kinds of the fibers are not limited thereto: for example, as another combination, selecting the aramid fibers 2 and the polyester fibers 3, is available a separator 1 where the silicas 5 adhere to surfaces thereof, and for example, as another kind is also available another separator 1 where the silicas 5 adhere to celluloses.

Although in the embodiments the silicas 5 are independently used as an inorganic compound for forming hydrosol, other than this, for example, alumina ($Al_2O_3$) may be used, and the silicas 5 and the alumina may be used in combination.

In use of the alumina an alumina sol usage is available, and is cited alumina sol (manufactured by Nissan Chemical Industries Ltd.) and the like.

In the embodiments the making method of the separator 1 for the electric double-layer capacitor is according to making the silicas 5 adhere to the surface of the separator 1 by adding the silica sol 22 to the aramid fibers 2, the polyester fibers 3, and the glass fibers 4 while mixing; then mixing them; and making paper: however, for example, other than this, making another separator 1 formed with containing the aramid fibers 2, the polyester fibers 3, and the glass fibers 4, and then coating the silica sol 22 on the surface of the separator 1 by using, for example, a brush, thereby making the silicas 5 adhere to the separator 1, and the separator 1 may be made; and still another separator 1 may also be made according to an impregnation adherence method for making the silicas 5 adhere to the separator 1 by impregnating it in the silica sol 22.

Here will be described, to be more precise, the impregnation adherence method for making silicas adhere to a separator by impregnating it in silica sol.

After impregnating the separator (hereinafter referred to as the "raw paper separator"), which becomes raw paper by a paper making machine, in an impregnation tank where silica sol of 1 mass percent to 40 mass percent is filled, pass the separator between two rolls that rotate in pressure-contact with each other, wring extra silica sol, adjust an adherence amount of the silicas to the separator from 1 mass percent to 20 mass percent in a solid content, and then dry the separator at 100 to 150 degrees Celsius. Because the separator thus obtained can use the raw paper separator manufactured by a usual paper manufacturing method as it is, a manufacturing efficiency thereof is excellent.

Subsequently, to be described more precisely, after impregnating the raw paper separator of a surface density of 14.9 g/m² made into paper by the paper making machine in a pallet (impregnation tank), where silica sol of 5 mass percent in concentration is filled, so that the aramid fiber compounding ratio the polyester fiber compounding ratio, and the glass fiber compounding ratio become 50, 20, and 30 mass percent, respectively, pass the raw paper separator between two rolls; wring the extra silica sol; dry a wrung separator on a vapor drying plate of about 100 degrees Celsius; and thus obtain a separator whose silica adherence amount and surface density are 11 mass percent and 16.5 g/m², respectively. This separator is made an example 16 and physicality thereof is shown in Table 6 in conjunction with the raw paper separator.

TABLE 6

| | | Raw Paper Separator | Example 16 |
|---|---|---|---|
| Compounding Ratio | Aramid fiber (mass percent) | 50 | 45 |
| | Polyester fiber (mass percent) | 20 | 18 |
| | Glass fiber (mass percent) | 30 | 27 |
| | Silica (mass percent) | 0 | 10 |
| Physicality | Surface density (g/m²) | 15 | 17 |
| | Thickness(μm) | 35 | 36 |
| | Maximum pore size (μm) | 2.3 | 2.5 |
| | Tensile strength (N/15 mm) | 10.8 | 14.7 |
| | Tensile elongation (%) | 3.2 | 2.0 |

What is claimed is:

1. A separator for an electric double-layer capacitor comprising:
   a glass fiber; a polyester fiber; and
   an aramid fiber,
   and the separator further comprising:
   an acryl resin and a cation fixing reinforcement agent as a binder for binding said glass fiber, said polyester fiber, and said aramid fiber,
   wherein paper making is performed.

2. A separator for an electric double-layer capacitor according to claim 1 which the separator contains said glass fiber of not less than 10 mass percent and not more than 40 mass percent.

3. A separator for an electric double-layer capacitor according to claim 2 which the separator contains said aramid fiber of not less than 40 mass percent and not more than 60 mass percent.

4. A separator for an electric double-layer capacitor according to claim 3 which the separator contains said polyester fiber of not less than 10 mass percent and not more than 30 mass percent.

5. A separator for an electric double-layer capacitor according to claim 2 which the separator contains said polyester fiber of not less than 10 mass percent and not more than 30 mass percent.

6. A separator for an electric double-layer capacitor according to claim 1 which the separator contains said aramid fiber of not less than 40 mass percent and not more than 60 mass percent.

7. A separator for an electric double-layer capacitor according to claim 6 which the separator contains said polyester fiber of not less than 10 mass percent and not more than 30 mass percent.

8. A separator for an electric double-layer capacitor according to claim 1 which the separator contains said polyester fiber of not less than 10 mass percent and not more than 30 mass percent.

9. An electric double-layer capacitor comprising two polarizable electrodes and a separator according to claim 1 between the electrodes.

10. A separator for an electric double-layer capacitor comprising:
    a fiber that makes an aromatic fiber a main component thereof; and
    an inorganic compound for being dispersed between said fiber and forming hydrosol that is made to adhere to a surface of said fiber, wherein an electrolyte solution comprises a hydrophilic organic solvent.

11. A separator for an electric double-layer capacitor according to claim 10 which the separator contains said inorganic compound of not less than 1 mass percent and not more than 20 mass percent.

12. A separator for an electric double-layer capacitor according to claim 11, wherein said inorganic compound comprises a particulate inorganic compound and a particle diameter of said particulate inorganic compound is not less than 1 nm and not more than 500 nm.

13. A separator for an electric double-layer capacitor according to claim 12, wherein said fiber comprises at least a glass fiber, and wherein total of said inorganic compound and said glass fiber is not less than 10 mass percent and not more than 50 mass percent.

14. A separator for an electric double-layer capacitor according to claim 11, wherein said fiber comprises at least a glass fiber, and wherein total of said inorganic compound and said glass fiber is not less than 10 mass percent and not more than 50 mass percent.

15. A separator for an electric double-layer capacitor according to claim 10, wherein said inorganic compound comprises a particulate inorganic compound and a particle diameter of said particulate inorganic compound is not less than 1 nm and not more than 500 nm.

16. A separator for an electric double-layer capacitor according to claim 15, wherein said fiber comprises at least a glass fiber, and wherein total of said inorganic compound and said glass fiber is not less than 10 mass percent and not more than 50 mass percent.

17. A separator for an electric double-layer capacitor according to claim 10, wherein said fiber comprises at least a glass fiber, and wherein total of said inorganic compound and said glass fiber is not less than 10 mass percent and not more than 50 mass percent.

18. A manufacturing method of a separator for an electric double-layer capacitor, the method comprising;
   a mixing process for mixing a fiber and an inorganic compound that forms hydrosol and is dispersed; and
   a paper making process for making paper from said mixed fiber and inorganic compound.

* * * * *